United States Patent
Sreedhar et al.

(10) Patent No.: US 11,829,619 B2
(45) Date of Patent: Nov. 28, 2023

(54) RESOURCE USAGE ARBITRATION IN NON-VOLATILE MEMORY (NVM) DATA STORAGE DEVICES WITH ARTIFICIAL INTELLIGENCE ACCELERATORS

(71) Applicant: Western Digital Technologies, Inc., San Jose, CA (US)

(72) Inventors: Adarsh Sreedhar, Bangalore (IN); Niraj Srimal, Kolkata (IN); Vimal Jain, Bangalore (IN)

(73) Assignee: Western Digital Technologies, Inc., San Jose, CA (US)

( * ) Notice: Subject to any disclaimer, the term of this patent is extended or adjusted under 35 U.S.C. 154(b) by 130 days.

(21) Appl. No.: 17/522,366

(22) Filed: Nov. 9, 2021

(65) Prior Publication Data
US 2023/0147294 A1 May 11, 2023

(51) Int. Cl.
*G06F 3/06* (2006.01)
*G06N 20/00* (2019.01)

(52) U.S. Cl.
CPC .......... *G06F 3/0631* (2013.01); *G06F 3/0604* (2013.01); *G06F 3/0659* (2013.01); *G06F 3/0679* (2013.01); *G06N 20/00* (2019.01)

(58) Field of Classification Search
CPC .... G06F 3/0631; G06F 3/0604; G06F 3/0659; G06F 3/0679; G06N 20/00
See application file for complete search history.

(56) References Cited

U.S. PATENT DOCUMENTS

| | | | |
|---|---|---|---|
| 2007/0118713 A1* | 5/2007 | Guterman | G06F 3/0607 711/170 |
| 2007/0136639 A1* | 6/2007 | Guterman | G06F 13/1694 714/763 |
| 2020/0035291 A1 | 1/2020 | Kasibhatla et al. | |
| 2020/0042240 A1 | 2/2020 | Therene et al. | |

(Continued)

OTHER PUBLICATIONS

Liang, Shengwen et al., "Cognitive SSD: A Deep Learning Engine for In-Storage Data Retrieval"; USENIX Association; 2019 USENIX Annual Technical Conference; Jul. 10-12, 2019; https://www.usenix.org/conference/atc19/presentation/liang; 17 pages.

*Primary Examiner* — Sean D Rossiter
(74) *Attorney, Agent, or Firm* — LOZA & LOZA, LLP; Gabriel Fitch

(57) ABSTRACT

Methods and apparatus are provided for arbitrating access to, and usage of, various device resources of a data storage device (DSD) configured for Machine Learning with Low-Power. The data storage device may include a TinyML controller with an artificial intelligence (AI) accelerator integrated with a data storage controller on a system-on-a-chip (SoC). The device resources may be, e.g., storage resources such as random access memory (RAM) devices, non-volatile memory (NVM) arrays, and latches formed on NVM dies of the NVM arrays. The resource arbitration may be based, for example, on parameters pertaining to ML operations performed by an ML controller that includes the AI accelerator, such as a turnaround time of an ML epoch or a stage-wise execution time. The resource arbitration is configured to provide for the efficient interleaving of the (Continued)

ML/AI operations performed by the ML controller and data storage operations performed by the data storage controller.

29 Claims, 19 Drawing Sheets

(56) References Cited

U.S. PATENT DOCUMENTS

| | | | |
|---|---|---|---|
| 2020/0057561 A1 | 2/2020 | Lai et al. | |
| 2020/0401344 A1* | 12/2020 | Bazarsky | G06N 3/063 |
| 2020/0411168 A1* | 12/2020 | Thomas | G06Q 10/06311 |
| 2021/0092069 A1 | 3/2021 | Musleh et al. | |
| 2021/0110250 A1 | 4/2021 | Kale et al. | |
| 2021/0374056 A1* | 12/2021 | Malladi | G06F 13/4234 |
| 2022/0092398 A1* | 3/2022 | Jennings | G06N 3/08 |
| 2022/0116057 A1* | 4/2022 | Doubchak | H03M 13/1108 |
| 2022/0254419 A1* | 8/2022 | Kim | H01L 24/08 |
| 2022/0357888 A1* | 11/2022 | Ballapuram | G06F 3/0634 |
| 2022/0398442 A1* | 12/2022 | Jones | G06N 3/08 |
| 2022/0413769 A1* | 12/2022 | Bazarsky | G06N 3/08 |

\* cited by examiner

RESOURCE USAGE ARBITRATION IN NON-VOLATILE MEMORY (NVM) DATA STORAGE DEVICES WITH ARTIFICIAL INTELLIGENCE ACCELERATORS

FIELD

The disclosure relates, in some aspects, to data storage devices having non-volatile memory (NVM) arrays. More specifically, but not exclusively, aspects relate to systems and methods for arbitrating resource usage within NVM data storage devices that include an artificial intelligence or machine learning accelerator integrated into the data storage device.

INTRODUCTION

Machine learning generally relates to the use of artificial intelligence (AI) to perform tasks without explicit instructions and instead involves relying on learned patterns and applying such learning for inference. Machine learning may be accelerated by using an AI accelerator such as a deep learning accelerator (DLA), e.g., a microprocessor device designed to accelerate the generation of useful neural networks to implement deep learning. Devices configured for machine learning may be installed within Internet-of-Things (IoT) devices that are designed for use at the "edge," i.e., close to the sources of data, such as sensors that log sensor data or security cameras that record video. Such machine learning devices may be configured as Machine Learning with Low-Power (ML/LP) devices or controllers, e.g., "tinyML" devices, wherein tinyML is a trademark of the tinyML Foundation. Resource usage arbitration issues, and other issues, can arise in such devices.

SUMMARY

The following presents a simplified summary of some aspects of the disclosure to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present various concepts of some aspects of the disclosure in a simplified form as a prelude to the more detailed description that is presented later.

One embodiment of the disclosure provides a data storage device that includes: data storage device resources comprising a non-volatile memory (NVM) array and a random access memory (RAM); a machine learning (ML) controller configured to perform ML operations to process ML data; a data storage controller coupled to the ML controller and the data storage device resources and configured to access the data storage device resources; and a resource usage controller configured to control usage of the data storage device resources by both the data storage controller and the ML controller based, at least in part, on the ML operations of the ML controller.

Another embodiment of the disclosure provides a method for use by a data storage device. The method includes: generating ML data using an ML controller of the data storage device by performing ML operations; and controlling usage of data storage device resources of the data storage device by both a data storage controller of the data storage device and the ML controller based, at least in part, on the ML operations of the ML controller; wherein the data storage device resources comprise an NVM array and RAM.

Another embodiment of the disclosure provides an apparatus of a data storage device. The apparatus includes: means for generating ML data by performing ML operations; and means for controlling usage of data storage device resources of the data storage device by both a data storage controller of the data storage device and the means for generating ML data based, at least in part, on the ML operations of the means for generating ML data; wherein the data storage device resources comprise an NVM array and RAM.

DETAILED DESCRIPTION

Figure 1:
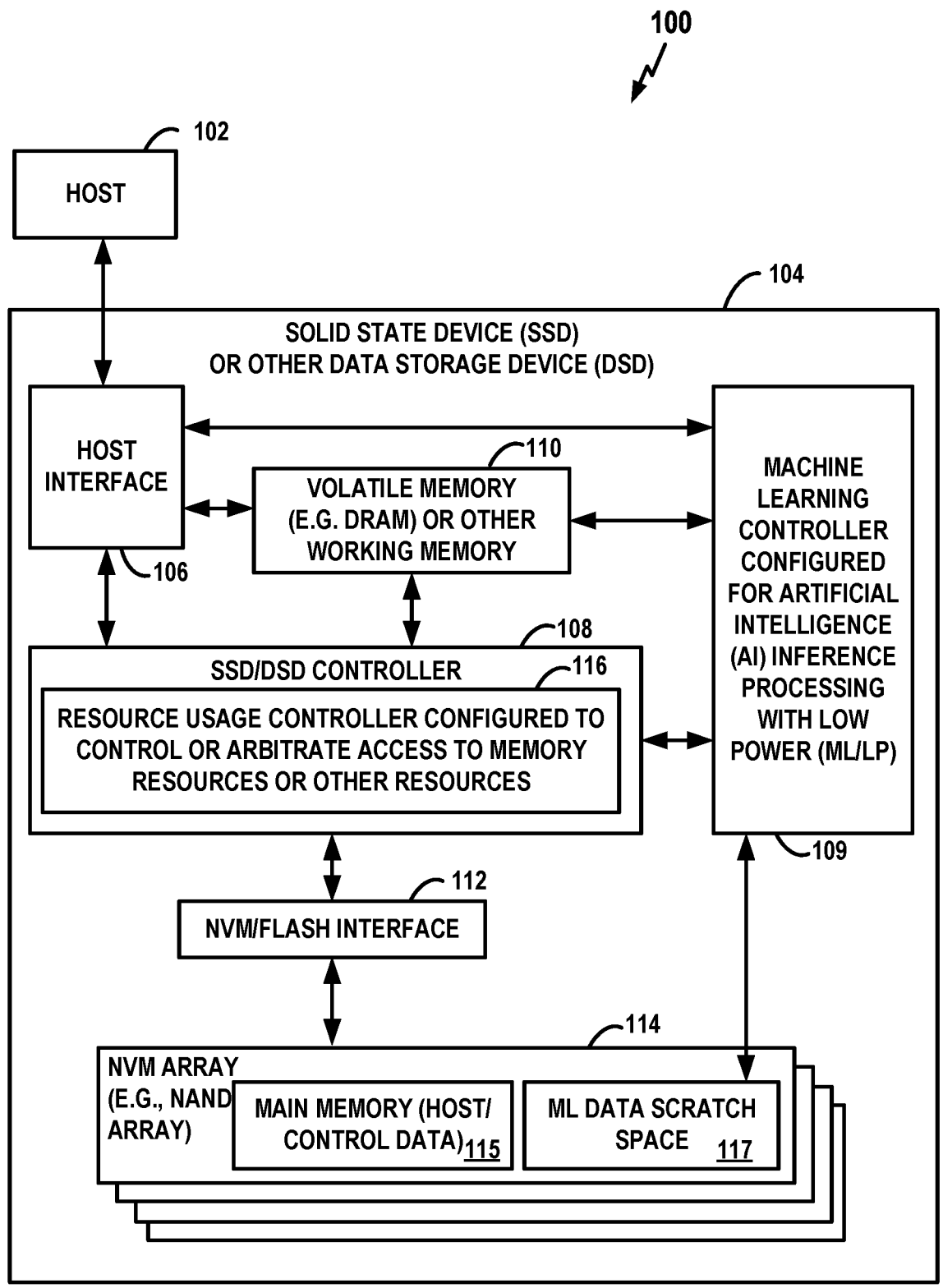
FIG. 1 is a schematic block diagram of a data storage device in the form of an exemplary solid state device (SSD), or other data storage device (DSD), having a non-volatile memory (NVM) array, where the SSD includes an ML/LP controller.

In the following detailed description, reference is made to the accompanying drawings, which form a part thereof. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

The examples herein relate to non-volatile memory (NVM) arrays, and to data storage devices or apparatus for controlling the NVM arrays, such as a controller of a data storage device (DSD), such as a solid state device (SSD), and in particular to solid-state memory storage devices such as those that use NAND flash memory (herein "NANDs"). (A NAND is a type of non-volatile storage technology that does not require power to retain data. It exploits negative-AND, i.e. NAND, logic.) For the sake of brevity, an SSD having one or more NAND dies will be used as a non-limiting example of a DSD below in the description of various embodiments. It is understood that at least some aspects described herein may be applicable to other forms of data storage devices as well. For example, at least some aspects described herein may be applicable to a data storage or memory device including phase-change memory (PCM) arrays, magneto-resistive random access memory (MRAM) arrays, storage class memory, and resistive random access memory (ReRAM) arrays. In addition, the various embodiments may be used in various machine learning devices which may include some combination of processing elements and memory/data storage elements, including the NVM arrays constructed/configured in accordance with the described embodiments.

Overview

As noted above, machine learning may be implemented within Internet-of-Things (IoT) devices designed for use at the "edge," i.e., IoT devices close to the sources of data such as environmental sensors that log sensor data or video security cameras that record video. Among the advantages, edge processing saves on network costs by avoiding transfers to/from other processing devices (such as cloud servers) and may improve data security, as data need not be transferred to centralized servers. Such edge-based IoT devices may be configured as Machine Learning with Low-Power (ML/LP) devices or controllers, e.g., tinyML devices. ML/LP may be regarded as a type of machine learning wherein deep learning networks are reduced to operate on very small microcontrollers that consume relatively little power. ML/LP typically uses the same procedures as with traditional ML for inference and related operations such as feature extraction, running sessions/epochs of an ML model and re-factoring. However, ML/LP may perform pruning and subsampling of weights to allow the device to consume fewer resources (e.g., memory and power).

For example, ML/LP microcontrollers may consume power in milliwatt (mW) ranges or below while using 300-500 kilobytes (kB) or less of memory. In some examples, the ML/LP controllers consume less than 10 mW and, for example, an ML/LP controller configured as a tinyML device may consume 5 mW. Accordingly, herein, "low power" refers to 10 mW or less. Solid state devices (SSD) or other data storage devices (DSD) that employ non-volatile memory (NVM) may be used for processing and storing the ML data. That is, an SSD may be configured as a ML/LP controller for use in an edge IoT device. This may be achieved by providing an AI accelerator (or AI core) along with the data storage controller and NVM of the SSD. For example, an AI accelerator configured for ML/LP may be integrated onto a single system-on-a-chip (SoC) that includes a data storage controller in the form of an application specific integrated circuit (ASIC) and, in some examples, also includes the NVM (e.g., a NAND array). Herein, the AI accelerator (with additional ML circuitry to operate the AI) is referred to as an ML controller.

The introduction of an ML controller into an SSD for processing user data stored on an NVM samples poses various engineering and technical challenges. For example, with an ML controller with an AI core, a dataset may take different processing times for various trained models depending on the complexity. For processing logger/sensor data, the unprocessed data may be incremental and so the same model may take different and/or increasing time to process progressive portions or chunks of raw data. This can influence resource usage on the SoC and may block some storage-critical operations such as garbage collection (which is a memory management operation performed on an NVM array).

Another example of a technical challenge is that many ML models are iterative, i.e., the models require several iterations to process data to generate final output data. The models may also need to retain all intermediate output data during processing, and so scratch space may be provided to store the intermediate data to avoid the need to re-process all of the data in case of a power loss. The additional scratch space storage reduces the amount of storage available for other uses, such as storage of user data from a host (host consumption).

Hence, for these and other reasons, there is a need to maximize resource usage for fast data processing by an ML/LP controller of a SSD without starving the data storage controller of the SSD of resources, which could hinder overall storage performance.

A possible "brute force" approach to address these issues would be to allocate a pre-defined quantum of resources (such as RAM and CPU bandwidth, as well as some NVM flash storage blocks) for intermediate ML data storage, e.g., a set of single level cell (SLC) blocks allocated for iterative data storage. One possible drawback is that, if there is no sound basis on which the number of SLC blocks is allocated and the ML controller infrequently uses SLC blocks, the SSD may be wasting valuable SLC blocks that otherwise could be used for storing control data or user data or to enhance burst performance. Another possible drawback is that allocating fixed RAM can cause maintenance and background operations to become slower, affecting the overall turnaround time to the host. For example, host write operations (where transfer RAM (tRAM) is often used to buffer speed differences between multi-level cell (MLC) consumption and the host) may be affected, thereby throttling the host. Note also that removable NVM storage devices are typically powered off (or put in low power mode) as soon as host operations are completed, and hence the removable NVM storage devices are not configured to recognize idle time (e.g., Idle Time mode). Such devices may therefore need strict monitoring by a firmware (FW) controller to control resources during Idle time mode.

Herein, methods and apparatus are provided for arbitrating the usage of device resources, such as RAM, within a data storage device equipped an ML/LP controller, wherein the arbitration is based, for example, on parameters pertaining to ML operations performed by the ML/LP controller, such as based on an ML iteration turnaround time. In the examples described herein, the ML/LP controller is configured for tinyML, but aspects disclosed herein may also be applicable to other low power ML controllers, such as a microML devices (i.e., ML devices consuming even less power than tinyML devices).

In the examples described herein, the data storage controller of the SSD is provided with a resource usage controller (which also may be referred to, e.g., as a resource usage arbitration controller or a resource arbitration controller) that can control (or at least influence) the ML controller and also control (or at least influence) data storage operations performed by the data storage controller. Note that a data storage controller primarily handles the storage in the NVM array of user data obtained from a host and the maintenance of the NVM array but can also store data in a RAM of the SSD. The ML controller processes raw input ML data from the host using its AI core to generate intermediate ML data and final output ML data, where the ML data may be stored either in the NVM array or in the RAM.

As will be explained, the resource usage controller may control or arbitrate access to the RAM by the data storage controller and the ML controller to allow the ML controller to perform efficiently while also preventing the data storage controller from being starved of its needed resources. The resource usage controller may control components of the data storage controller to suspend GC operations or other background operations (BKOPs) on the NVM, when appropriate, to permit more efficient usage of the NVM by the ML controller. In other cases, the resource usage controller may instead control the ML controller to suspend its NVM storage operations, when appropriate, to permit the data storage controller to perform urgent GC operations. These are just some examples of the various forms of resource usage control or arbitration described herein.

Note also that the resource usage controller described herein need not be a single device that controls all of the various resource usage arbitration functions described herein. Rather, the resource usage controller may be a collection of functions performed by or implemented by various components of the SSD, with different functions potentially implemented by different components of the SSD, and with some of the functions implemented in firmware or hardware and some potentially implemented in software.

In an illustrative example, an offline trained ML model is used, wherein the weights and parameters of the ML model are supplied by a host. An initial allocation of resources can be system-defined or host-hinted, and refactoring can be performed after the model is run based on the inference metadata. Examples of inference metadata can include turnaround time of an ML epoch (e.g., iteration), stage-wise execution time, units of storage required for the intermediate data, etc. Once an approximation is made as to the number of ML operations required, the resource usage controller can alter resource sharing dynamically based on storage and inference operations.

The resource usage controller may be configured to be transparent to the ML model (i.e., the resource usage controller need not know the particular ML model being used by the ML controller). In some examples, the resource usage controller uses more metadata than the ML model (or ML inference procedure) needs, so as to permit the resource usage controller to provide efficient usage of device resources. This can be important because it enables the ML controller to use any ML model of varying parameters/applications (including training capabilities) while still allowing the firmware of the data storage controller to perform optimizations based on the metadata. Note that the resource usage controller should also keep track intermediate output data and the iteration meta-data, so that the ML controller can continue inference operations across power cycles and similar events.

Generally speaking, the resource usage controller of the SSD is configured to provide for the efficient interleaving of the ML/AI operations performed by the ML controller and the storage operations performed by the data storage controller.

These and other features will be described below.

Exemplary Data Storage Device with Machine Learning AI Core

FIG. 1 is a block diagram of a system 100 including an exemplary SSD (or DSD) having an ML controller and a resource usage controller that controls or arbitrates resource access by the ML controller and other components. The system 100 includes a host 102 and an SSD 104 or other DSD coupled to the host 102. The SSD 104 may be configured for machine learning with low power. The host 102 provides commands to the SSD 104 for transferring data between the host 102 and the SSD 104. For example, the host 102 may provide a write command to the SSD 104 for writing data to the SSD 104 or a read command to the SSD 104 for reading data from the SSD 104. The host 102 may be any system or device with a need for data storage or retrieval and a compatible interface for communicating with the SSD 104.

Within illustrative examples, the host 102 is an edge IoT device such as an environmental sensor or a video security camera. However, host 102 is not limited to IoT devices and, in other examples, the host 102 may be a computing device, a personal computer, a portable computer, a workstation, a server, a personal digital assistant, a digital camera, or a digital phone as merely a few examples. Additionally or alternatively, the host 102 may be a system or device having a need for neural network processing or other ML processing, such as speech recognition, computer vision, and self-driving vehicles. For example, the host 102 may be a component of a self-driving system of a vehicle. For the particular example where the host 102 is a video security camera, the neural network processing may be performed to identify particular individuals captured by the camera via facial recognition or the like. In other examples, the neural network processing may be performed to determine what data to save (for subsequent review, e.g., by operators at a remote location) and what data to discard. Note that neural networks represent one model for use with ML and many of the features described herein are not limited to neural networks.

The SSD 104 includes a host interface 106, an SSD/DSD controller 108, an ML/LP controller 109, a volatile memory 110 (such as DRAM) or other working memory, an NVM interface 112 (which may be referred to as a flash interface), and an NVM array 114. The host interface 106, the SSD/DSD controller 108, the ML/LP controller 109, the volatile memory 110 and the NVM interface 112 may all be formed on (or integrated on) a single SoC. The NVM array 114 includes one or more NAND dies, each including (a) a first portion of memory for use as main memory 115 and (b) a second portion of memory for use as an ML data scratch space 117. In some examples, the ML data scratch space 117 may be a separate partition of the NVM array. In other examples, the ML data scratch space 117 is just a separate portion of the NVM array. In some examples, the NVM array 114 may also be a portion of the SoC, i.e., the entire SSD 104 may be a single SoC. Note also that, although described primarily with reference to examples where the ML/LP controller 109 is a component of the SSD 104, the ML/LP controller 109 instead may be separate from the SSD 104.

Main memory 115 may also be referred to as user data memory since, for the most part, it will store user data provided by the host 102 (i.e., host data), although it may also store control data. However, other types of data may be stored in the main memory 115, such as other types of non-ML scratch space data provided by the host 102 or the SSD controller 108. Also, in some examples, some ML data may be stored in main memory 115 as well. The ML data scratch space 117 primarily stores intermediate ML data generated by the ML/LP controller 109 during its processing. However, other types of data might be stored in the ML data scratch space 117 as well.

The host interface 106 is coupled to the SSD controller 108 and facilitates communication between the host 102 and the SSD controller 108. The SSD controller 108 is coupled to the volatile memory 110 as well as to the NVM array 114 via the NVM interface 112. The host interface 106 may be any suitable communication interface, such as a Non-Volatile Memory express (NVMe) interface, a Universal Serial Bus (USB) interface, a Serial Peripheral (SP) interface, an Advanced Technology Attachment (ATA) or Serial Advanced Technology Attachment (SATA) interface, a Small Computer System Interface (SCSI), an IEEE 1394 (Firewire) interface, or the like. In some embodiments, the host 102 includes the SSD 104. In other embodiments, the SSD 104 is remote from the host 102 or is contained in a remote computing system communicatively coupled with the host 102. For example, the host 102 may communicate with the SSD 104 through a wireless communication link.

Although, in the example illustrated in FIG. 1, SSD 104 includes a single channel between SSD controller 108 and NVM die(s) 114 via interface 112, the subject matter described herein is not limited to having a single memory channel. For example, in some NAND memory system architectures, two, four, eight or more NAND channels couple the controller and the NAND memory device, depending on controller capabilities. In any of the embodiments described herein, more than a single channel may be used between the controller and the memory die, even if a single channel is shown in the drawings. The SSD controller 108 may be implemented in a single integrated circuit chip and may communicate with different layers of memory in the NVM die(s) 114 over one or more command channels.

The SSD controller 108 controls operation of the SSD 104. In various aspects, the SSD controller 108 receives commands from the host 102 through the host interface 106 and performs the commands to transfer data between the host 102 and the main memory 115 of the NVM array 114.

As shown in FIG. 1, the NVM controller 116 of the SSD controller 108 is configured to access the NVM array 114 using flash management components (e.g., an FTL), which may include FW-based components. (Some of these components may be within the NVM/flash interface 112.) That is, the SSD controller 108 may include FW-based flash management components or memory management components for managing the NVM array 114. Furthermore, the SSD controller 108 may manage writing/reading to/from volatile memory 110 to perform the various functions effected by the SSD controller 108 and to maintain and manage cached information stored in the volatile memory 110.

In the example of FIG. 1, the ML/LP controller 109 is connected the host interface 106 to receive ML-specific commands and data from the host 102 (such as ML input training data) and to send command replies and output data to the host 102 (such as trained ML neural network parameters). In other examples, all communication between the ML/LP controller 109 and the host 102 may be through the SSD/DSD controller 108. As shown, the ML/LP controller 109 may also be connected to volatile memory 110 (or to a separate volatile memory, not shown) for writing and reading from/to volatile memory. In other examples, all transfers between the ML/LP controller 109 and the volatile memory 110 may be through the SSD/DSD controller 108. Note that the NVM array 114 may also include at least some on-chip ML computational components as well as at least some on-chip user data computation components.

The SSD controller 108 and the ML/LP controller 109 may include any type of processing device, such as a microprocessor, a microcontroller, an embedded controller, a logic circuit, software, FW, or the like. In some aspects, some or all of the functions described herein as being performed by the SSD controller 108 or the ML/LP controller 109 may instead be performed by another element of the SSD 104. For example, the SSD 104 may include a microprocessor, a microcontroller, an embedded controller, a logic circuit, software, FW, or any kind of processing device, for performing one or more of the functions described herein as being performed by the SSD controller 108 or the ML/LP controller 109. According to other aspects, one or more of the functions described herein as being performed by the SSD controller 108 or the ML/LP controller 109 are instead performed by the host 102. In still further aspects, some or all of the functions described herein as being performed by the SSD controller 108 or the ML/LP controller 109 may instead be performed by another element such as a controller in a hybrid drive including both non-volatile memory elements and magnetic storage elements.

The volatile memory 110 may be any suitable memory, computing device, or system capable of storing data. For example, the volatile memory 110 may be ordinary RAM, DRAM, double data rate (DDR) RAM (DRAM), static RAM (SRAM), synchronous dynamic RAM (SDRAM), a flash storage, an erasable programmable read-only-memory (EPROM), an electrically erasable programmable ROM (EEPROM), or other fast non-volatile memory such as storage class memory (e.g., MRAM, ReRAM, PCM) or the like. In various embodiments, the SSD controller 108 and the ML/LP controller 109 use the volatile memory 110, or a portion thereof, to store data during the transfer of data between the host 102 and the NVM array 114. For example, the volatile memory 110 or a portion of the volatile memory 110 may be a cache memory. The NVM array 114 receives data from the SSD controller 108 via the NVM interface 112 and stores the data in the main memory 115. The NVM array 114 may be any suitable type of non-volatile memory, such as a NAND-type flash memory or the like. In some embodiments, volatile memory 110 may be replaced by a non-volatile memory such as MRAM, PCM, ReRAM, etc. to serve as a working memory for the overall device.

In the example of FIG. 1, the ML/LP controller 109 may include hardware, FW, software, or any combinations thereof that provide for AI inference processing or the like using an AI core or similar device. In some examples, the ML/LP controller 109 is configured for tinyML. In other examples, the ML controller is configured as another type of ML controller such as MicroML or as a normal full-size/full-power ML controller. As shown, the ML/LP controller 109 is coupled directly to the ML data scratch space 117 so that it can directly store and retrieve data from/to the scratch space 117 while bypassing the flash interface 112. In other examples, all ML storage operations to the scratch space 117 are performed through the SSD controller 108 via the flash interface 112.

Details of SSDs configured to permit an ML device of an SSD to directly access a portion of NVM while bypassing a flash interface are set forth in U.S. patent application Ser. No. 17/499,572, entitled "HYBRID MEMORY MANAGEMENT OF NON-VOLATILE MEMORY (NVM) DEVICES FOR USE WITH RECURRENT NEURAL NETWORKS," filed Oct. 12, 2021 and in U.S. patent application Ser. No. 17/499,588, also entitled "HYBRID MEMORY MANAGEMENT OF NON-VOLATILE MEMORY (NVM) DEVICES FOR USE WITH RECURRENT NEURAL NETWORKS," filed Oct. 12, 2021, both of which are assigned to the assignee of the present application and are incorporated by reference herein.

Although FIG. 1 shows an exemplary SSD and an SSD is generally used as an illustrative example in the description throughout, the various disclosed embodiments are not necessarily limited to an SSD application/implementation. As an example, the disclosed NVM die and associated processing components can be implemented as part of a package that includes other processing circuitry and/or components. For example, a processor may include, or otherwise be coupled with, embedded NVM and associated circuitry and/or components for NTM processing that are described herein. The processor could, as one example, off-load certain NTM processing tasks from the ML/LP controller 109 to the NVM and associated circuitry and/or components.

SSD controller 108 includes a resource usage controller 116 configured to control or arbitrate access to memory resources (e.g., scratch space 117 or volatile memory 110) or other resources of the SSD 108. For example, the resource usage controller 116 may be configured to control at least some storage operations of the data storage controller 108 and of the ML/LP controller 109 based, at least in part, on ML operations of the ML/LP controller 109. Exemplary resource usage controller functions were summarized above in the Overview Section and will be described in detail below. As noted above, the resource usage controller need not be a single device that controls all of the various resource usage arbitration functions described herein. Rather, the resource usage controller 116 may be a collection of functions performed by or implemented by various components of the SSD 104, with different functions potentially implemented by different components of the SSD, and with some functions implemented in FW or HW and with some potentially implemented in software.

Figure 2:
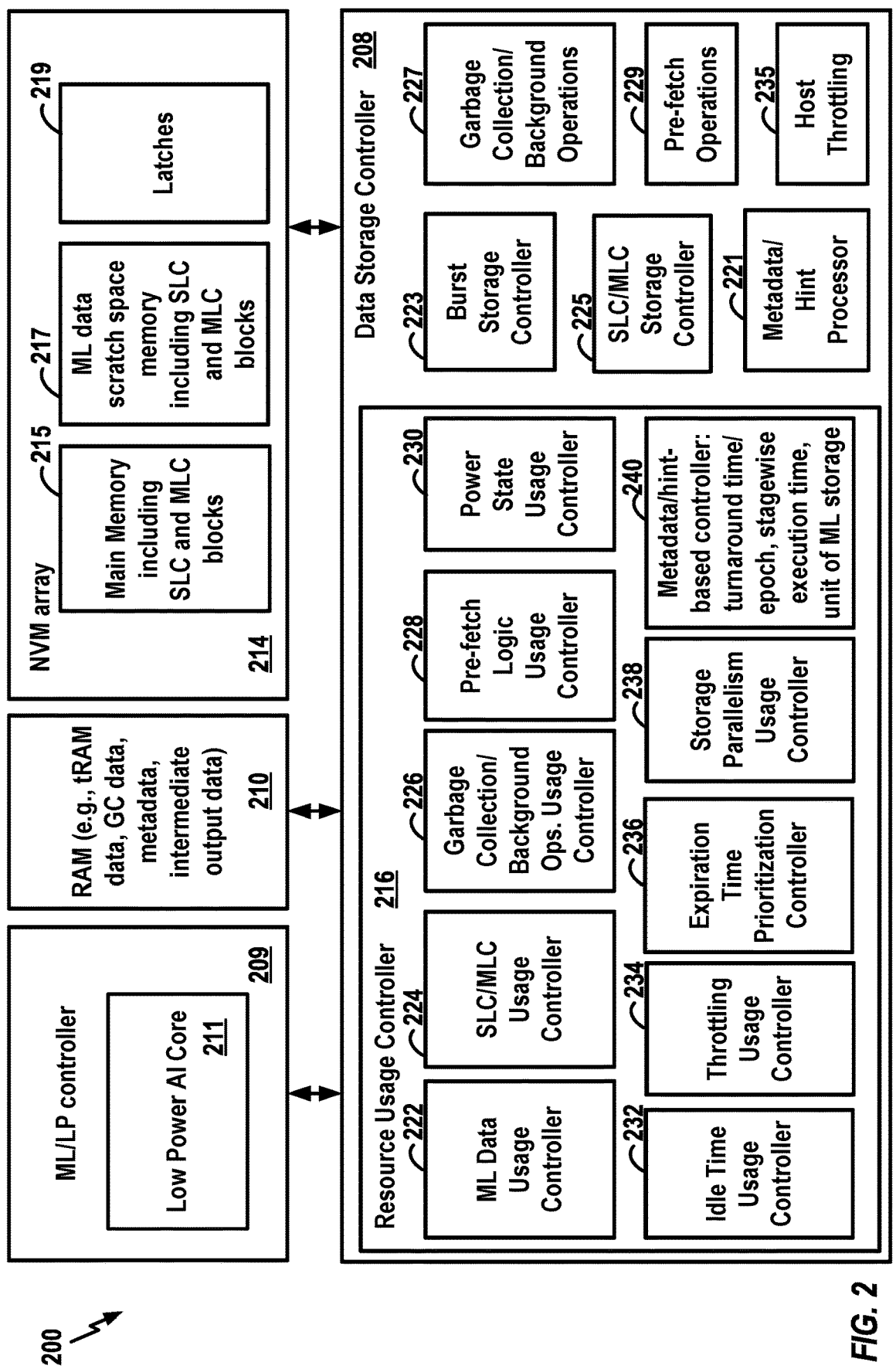
FIG. 2 illustrates components an exemplary SSD having an ML/LP controller, the SSD also having a resource usage controller for controlling access to device resources by the ML/LP controller and other components of the data storage controller.

FIG. 2 illustrates a block diagram of selected components an exemplary SSD 200 having a ML/LP controller 209 with a low power AI core 211 (e.g., a tinyML AI core), a RAM 210, and an NVM array 214 that includes a main memory portion 215 (which may include SLC blocks and MLC blocks), an ML data scratch space portion 217 (which may also include SLC blocks and MLC blocks) and a set of latches 219. As shown, the RAM 210 may store, e.g., tRAM data, GC data, metadata, and intermediate output data). FIG. 2 also illustrates a data storage controller 208, which includes a resource usage controller 216, with various sub-components shown that perform or control various arbitration or other functions to efficiently interleave ML/AI operations performed by the ML controller 209 and the operations performed by the data storage controller 208.

An ML data usage controller 222 of the resource usage controller 216 controls resource usage arbitration related to intermediate ML output data generated by the ML controller 209 while it performs AI inference operations or other AI functions.

For example, if the turnaround time for one ML iteration is relatively quick (as determined by a turnaround time threshold) and/or the output of one iteration is the input for the next iteration (as determined, e.g., by information provided by the ML controller 209 based on the design of the AI core 211), the ML data usage controller 222 may direct the ML controller 209 to either store its ML output data in the scratch space memory 217 at every Nth iteration interval or instead forego the scratch space and place the intermediate ML outputs in the RAM 210. In this regard, the risk of losing processed ML data in the event of a power-cycle is weighed against the benefit of boosting storage operations (e.g., by extending burst performance) so that an informed decision can be made by the ML data usage controller 222 based on the turnaround time or other parameters. On the other hand, if the turnaround time for one ML iteration is relatively long (as determined by the turnaround time threshold) and/or the turnaround time is increasing with successive iterations (as determined by measuring any increase in the turnaround time), the ML data usage controller 222 may determine there is more merit in storing the intermediate ML data in the scratch space memory 217 rather than placing the ML outputs in the RAM 210 (and thus risking the need to re-process the data from the beginning in case of a power-cycle event).

The ML data usage controller 222 may also measure the average host session time and/or frequency of power-loss events, and direct (or otherwise influence) the ML controller 209 to store its intermediate ML output data in scratch space memory 217. For example, if the average host session time exceeds a host session time threshold, the ML data usage controller 222 may direct the ML controller 209 to store its intermediate ML output data in the scratch space memory 217, and to instead store the intermediate ML output data in the RAM 210 if the average host session time exceeds the host session time threshold. As another example, if the frequency of power-loss events does not exceed a power-loss frequency threshold (i.e., power loss events are relatively rare), the ML data usage controller 222 may direct the ML controller 209 to store its intermediate ML output data in the RAM 210, and to instead store the intermediate ML output data in the scratch space memory 217 when the frequency of power-loss events exceeds the power-loss frequency threshold (i.e., power loss events are more common).

If the SSD 200 supports burst performance (via a burst storage controller 223) and SLC blocks within the NVM array 214 are employed for storing data received in bursts, the ML data usage controller 222 can direct the ML controller 209 to store its intermediate ML outputs in the scratch space 217 as MLC data (or as SLC data in MLC, which can help balancing endurance), as the cost to allocate SLC scratch space in an NVM for long turnaround times is often outweighed by utilizing SLC for burst storage operations.

If raw ML data from a host (e.g., host 102 of FIG. 1) is provided in bursts and is transient (i.e. the raw data does not require storage since it is to be processed immediately by the AI code 211), the ML data usage controller 222 can direct the ML controller 209 to store the raw data within the internal (i.e., on-chip) NAND latches 219 on a die of the NVM array 214, at least if the RAM 210 has no space available to store the transient data. In an example where 384 KB of cache is present in the latches 219, the latches 219 may be able to store all such transient ML data, as well as intermediate ML output data. The determination of whether the raw data is transient may be determined from information obtained from the ML controller 209 or may be determined from metadata or hints received from the host providing the raw data. The metadata and hints may be extracted from commands received from a host using a metadata/hint processor 221. The metadata may include, e.g., a turnaround time of an ML epoch, a stage-wise execution time of an ML operation, and a unit of storage for storing intermediate ML data. Still further, if the data storage controller 208 sets aside a few pages in the RAM 210 for address tables to avoid the need to read that information from the NVM array 214, the ML data usage controller 222 may control the ML controller 209 to store intermediate ML data in the portion of the RAM that is otherwise used for the address tables, so long as that portion is not currently being used by the data storage controller 208 or the tables can later be re-stored in RAM. For example, if the data storage controller 208 maintains copies of address tables in the NVM array 214, the address tables in RAM 210 may be overwritten with ML data and then, if needed, the data storage controller can retrieve the address tables from the NVM array 214 and re-store the tables in the RAM 210.

An SLC/MLC usage controller 224 of the resource usage controller 216 controls resource usage arbitration related to SLC/MLC blocks within the NVM array 214. If an SLC/MLC controller 225 of the data storage controller 208 is configured to perform direct writes of user data to MLC blocks in the NVM array 214, significant RAM may be required to temporarily store the user data before the data is programmed to (i.e., written to) the MLC blocks. If the ML controller 209 is operating on real time data (as determined, for example, based on metadata or hints from the host or by information obtained from the ML controller 209), and the portion of RAM 210 that is reserved for temporary MLC storage is currently free, that portion of the RAM can be used by the ML controller 209 to store intermediate ML data. Accordingly, the SLC/MLC usage controller 224 determines whether the portion of RAM is free and, if so, the SLC/MLC usage controller 224 directs the ML controller 209 to store intermediate ML data in the free portion of the RAM 210. In some examples, the SLC/MLC usage controller 224 can also direct the SLC/MLC storage controller 225 of the data storage controller 208 to switch from MLC to an SLC/Hybrid mode to reduce RAM usage to allow for more storage of intermediate ML data. (SLC/Hybrid mode is a mode in which SLC cells are read in one plane while MLC is read in another plane.)

A GC/BKOPs usage controller 226 of the resource usage controller 216 controls resource usage arbitration related to GC/BKOP performed by a GC/BKOPS component 227 of the data storage controller 208. BKOPs may include, e.g., wear leveling and read scrub operations. For example, based on the ML/AI state (e.g., the ML load) of the ML controller 209, the GC/BKOPs usage controller 226 can direct the GC/BKOPs component 227 data storage controller to withhold its GC/BKOPS and temporarily allow the NVM array 214 to accumulate blocks and then free the blocks subsequently once ML load reduces. The GC/BKOPs usage controller 226 can use different thresholds for controlling the yielding of GC/BK operations to ML operations. For example, if a measured ML load exceeds an ML load threshold, the GC/BKOPs usage controller 226 directs the GC/BKOPs component 227 data storage controller to suspend all of its GC/BKOPS. (In some examples, different ML load thresholds may be set for suspending wear leveling as opposed to read scrub.) Conversely, the GC/BKOPs usage controller 226 can direct the ML controller 209 to suspend ML operations upon detection of urgent or critical GC (where urgent or critical GC operations may be defined as GC operations that must be performed before further NVM programming operations can proceed). In this regard, a normal GC operation is a GC operation that can wait until a next idle time. An urgent or critical GC operation is one that cannot wait until the next idle time because, for example, blocks need to be freed within the NVM array to allow a write command to be performed. Hence, if at least one urgent GC operation (or other BKOP) is pending, ML operations may be suspended. Otherwise, any pending GC operations (or other BKOPs) may wait until a next idle time. Note also that, if BKOPs such as wear levelling or read scrub are required, ML data stored in the NVM array 214 can be read back from the NVM array 214 and stored in RAM 210. The GC/BKOPs usage controller 226 can tune the ML controller 209 to utilize available processing time slices or available NVM storage blocks without affecting the BKOPs (where time slices may refer to processing cycles of the data storage controller that can be devoted to various operations).

A pre-fetch logic usage controller 228 of the resource usage controller 216 controls resource usage arbitration related to pre-fetch operations performed by a pre-fetch component 229 the data storage controller 208. For example, when burst performance is not required, the pre-fetch logic usage controller 228 may direct the pre-fetch component 229 to pre-fetch raw ML data from a host before completion of a current ML iteration of the ML controller 209 to avoid idling of the AI core 211 of the ML controller 209, at least once the pre-fetch logic usage controller 228 determines a consumption value for the ML model used by the AI core 211 (which may be determined based on information obtained from the ML controller 209). Data chunks being pre-fetched can be either be fetched entirely onto the RAM 210 (in response to a determination of low storage activity in the RAM) or can be pulled to temporary SLC blocks in the NVM array 214 from MLC blocks of the NVM array 214 (assuming that raw ML data is stored in the MLC blocks).

A power state usage controller 230 of the resource usage controller 216 controls resource usage arbitration related to power states of the SSD 200. For example, SSD specifications and applicable NVM specifications (such as NVM express (NVMe) specifications) may define different modes of power, each of which has a corresponding drop/rise in performance. In some examples, the lowest power state, also called Deep Power Down State, supplies power only to an Always-ON region of the SSD 200, while the data storage controller 208 is powered off entirely. The AI core 211 of the ML controller 209 may be designated as part of the Always-ON region to be supplied power, thereby allowing the ML controller 209 to perform ML inference operations even without any data storage controller 208 activity. The designation of the AI core 211 as part of the Always-ON region may be specified during SSD design. In other examples, the power state usage controller 230 performs the designation. It is noted that, once the data storage controller 208 is powered-down, the power state usage controller 230 is also powered down and hence the power state usage controller 230 operates only while the data storage controller 208 operates. Note that the frequency of an AI accelerator can also vary with the power state, and hence computation time can vary too. Thus, in some examples, while the power state usage controller 230 is operating, it can control the frequency of clock signals provided to the AI core 211 by controlling power usage and thereby control or influence computations times.

An idle time usage controller 232 of the resource usage controller 216 controls resource usage arbitration related to idle time. In this regard, if the SSD 200 supports idle time operations (where power is still available to the components of the SSD without host commands in progress), the idle time usage controller 232 can direct the ML controller 209 to use the entire RAM 210 during idle time.

A throttling usage controller 234 of the resource usage controller 216 controls resource usage arbitration related to host throttling by the SSD 200. In this regard, if the SSD 200 supports throttling the host, the throttling usage controller 234 can request such throttling based on ML/AI algorithm requirements/states (as determined from information provided by the ML controller 209), which a host throttling controller 235 of the data storage controller 208 can then accept or deny (if throttling would conflict with other operations of the data storage controller 208).

An expiration time prioritization controller 236 of the resource usage controller 216 controls resource usage arbitration related to expiration time prioritization. For example, the expiration time prioritization controller 236 may also choose to prioritize processing of data stored in the NVM array 214 by the ML controller 209 that is nearing an expiry time so as not delay the invalidation of such data within the NVM array 214 until the processing is completed. In some examples, the expiration time prioritization controller 236 may examine time stamps on raw ML data from the host (or metadata or hints) to assess expiration times, if any, and then control other processing components of the SSD 200 to suspend or delay their processing to permit the ML controller 209 to use more of the RAM 210 or to use other resources that can expedite processing. In other examples, an expiration time of data may be stored along with the ML data in the NVM array 214. Note also that, in some examples, raw data to be processed is time critical, i.e., it must be processed within a certain period of time; otherwise the data is no longer useful (i.e., the data is stale).

A storage parallelism usage controller 238 of the resource usage controller 216 controls resource usage arbitration related to storage parallelism (e.g., if there are multiple NVM dies within the NVM array 214). For example, the storage parallelism usage controller 238 can prevent or avoid bottlenecks at the NAND level by placing both raw and processed ML data across a set of flash interface modules (FIMs)/dies/planes (not specifically shown in FIG. 2) to leverage parallelism and interleaving during writes, as well as using asynchronous independent plane read (AIPR) mechanisms during reads. The storage parallelism usage controller 238 may also operate to relocate written data across storage entities (e.g., different NVM dies of a multi-die NVM array) to maximize parallelism.

A metadata/hint controller 240 of the resource usage controller 216 controls resource usage arbitration related to metadata and hints, e.g., determining parameters such as the turnaround time of an ML epoch, the stage-wise execution time of an ML operation, and the unit of storage for storing intermediate ML data (e.g., wordline or block size). Note that with low 2/4 bit resolution for integer/floating-point representations, computations can be significantly reduced to use-cases of reducing entropy. Raw data for processing can be allocated in units of 4 kilobytes (KB), as that is often the smallest addressable unit in an SSD (e.g., a NAND-based flash memory device). Data can be consumed 32/64 bits at a time depending on the ML nodes and may be stored as intermediate output elsewhere, until the entire 4 KB of data is processed. This data can then be stored in NVM, or re-submitted to the AI core for the next epoch) iteration.

Note that not all of the features shown in FIG. 2 are required. For example, in some embodiments, the resource usage controller 216 will omit some of the individual sub-components shown in FIG. 2. The resource usage controller 216 need not be a single device that controls the various functions shown in FIG. 2. Rather, the resource usage controller 216 may be a collection of functions performed by or implemented by various components of the SSD 200, with some of the functions implemented in firmware or hardware and some potentially implemented in software.

In the following, various features described in connection with FIG. 2 will now be described with reference to flowcharts that highlight those features.

Figure 3:
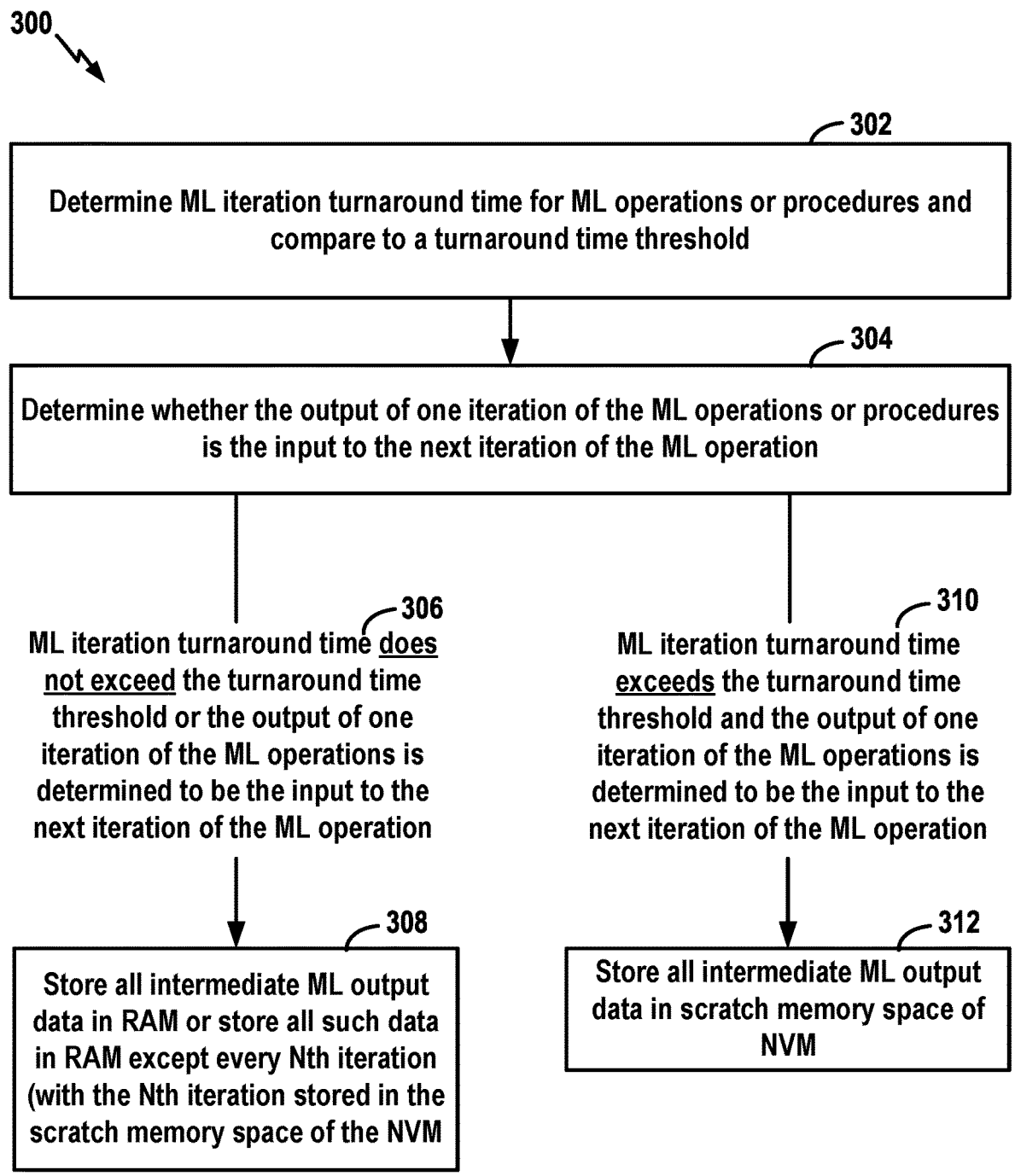
FIG. 3 illustrates an exemplary method for use with ML processing, wherein resource arbitration is performed based on ML iteration turnaround time.

FIG. 3 illustrates an exemplary method 300 for use with ML processing according to aspects of the present disclosure wherein RAM/NVM resource arbitration is performed based, in part, on ML iteration turnaround time. Beginning at block 302, a controller (such as the controller 222 of the resource usage controller 216 of FIG. 2) determines or measures an ML iteration turnaround time for ML operations or procedures (e.g., iterative ML model operations of the AI core 211 of FIG. 2) and compares the turnaround time to a turnaround time threshold. At block 304, the controller determines whether the output of one iteration of the ML operations or procedures of the AI core is the input to the next iteration of the ML operation (as determined, e.g., by information provided by the ML controller 209). If, as indicated at 306, the ML iteration turnaround time does not exceed the turnaround time threshold or the output of one iteration of the ML operations is found to be the input to the next iteration of the ML operation, then, at block 308, all intermediate ML output data from the ML controller is stored in RAM or, in some examples, all such data is stored in RAM except every Nth iteration of the data (with the Nth iteration stored in the scratch memory space of the NVM). In this manner, all or most intermediate ML output data is stored in RAM to enhance processing speed in circumstances where there is relatively little risk that the ML data will be lost due to power cycling or other issues.

Conversely, if, as indicated by 310, the ML iteration turnaround time exceeds the turnaround time threshold and the output of one iteration of the ML operations is found to be the input to the next iteration of the ML operation, then, at block 312, all intermediate ML output data from the ML controller is stored in the scratch memory space of the NVM. That is, in this case none of the intermediate ML output data is stored in RAM due to a relatively high risk that the ML data will be lost due to power cycling or other issues. A suitable initial value for the turnaround time threshold may be determined in advance by engineers during SSD design using otherwise routine experimentation based, for example, on tests conducted with sample SSDs running sample ML models on sample input data. In some examples, the controller may then adaptively adjust the threshold based on actual measured turnaround times in an effort to maximize processing speed while minimizing risk of loss of data.

Figure 4:
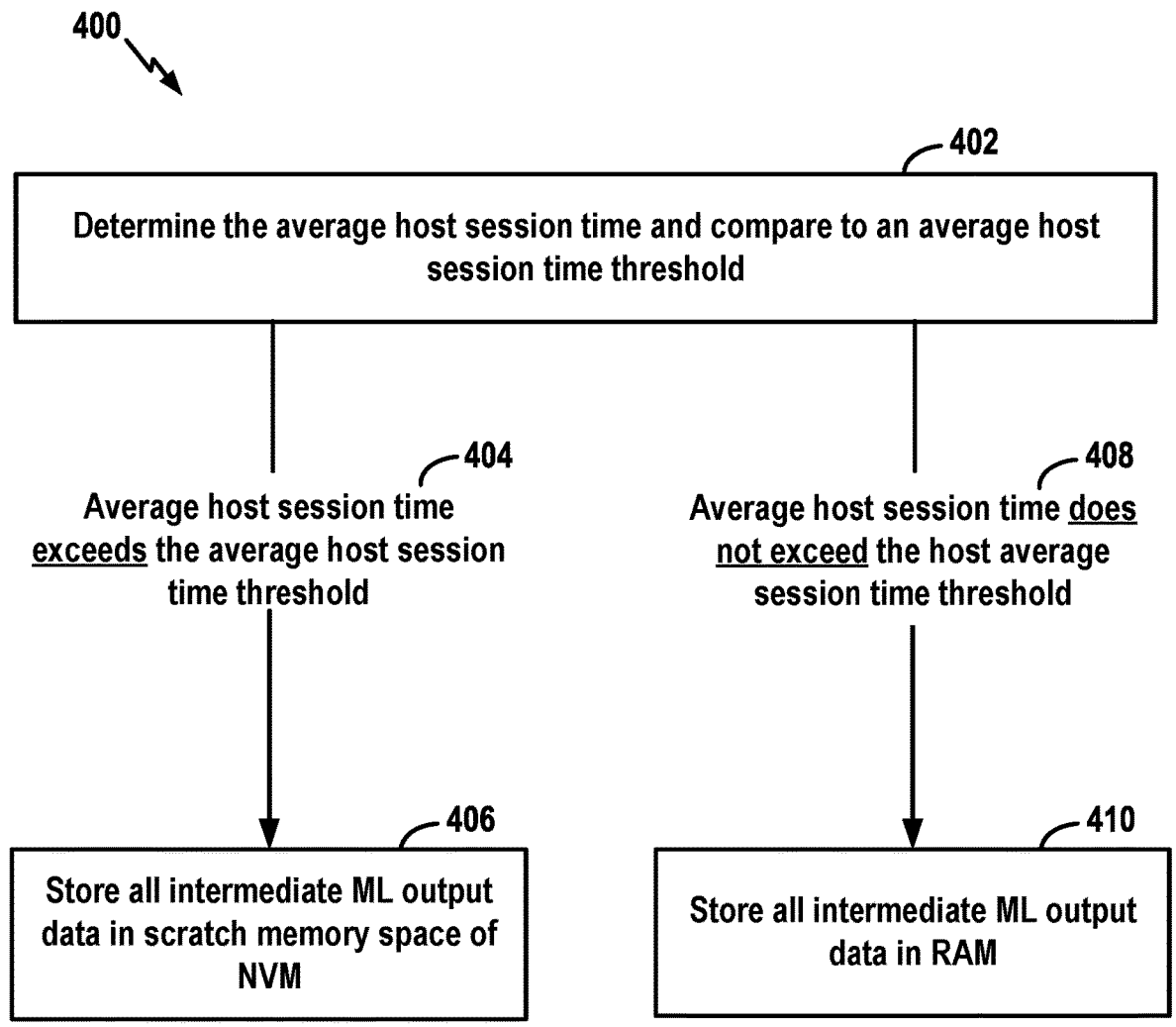
FIG. 4 illustrates an exemplary method for use with ML processing, wherein resource arbitration is performed based on an average host session time.

FIG. 4 illustrates an exemplary method 400 for use with ML processing according to aspects of the present disclosure wherein RAM/NVM resource arbitration is performed based on an average host session time. Beginning at block 402, a controller (such as the controller 222 of the resource usage controller 216 of FIG. 2) determines or measures an average host session time during (or duration for) on-going ML operations or procedures (e.g., ML operations of the AI core 211 of FIG. 2) and compares the average host session time to an average host session time threshold. If, as indicated at 404, the average host session time exceeds the average host session time threshold then, at block 406, all intermediate ML output data from the ML controller is stored in the scratch memory space of the NVM. That is, all of data is stored in NVM due to a relatively high risk that the ML data will be lost if stored in RAM due to power cycling or other issues. Conversely, if, as indicated by 408, the average host session time does not exceed the average host session time threshold then, at block 410, all intermediate ML output data from the ML controller is stored in RAM. That is, in this case, all of the intermediate ML output data is stored in RAM due to relatively little risk that the ML data will be lost due to power cycling or other issues. A suitable initial value for the average host session time threshold may be determined in advance by engineers during SSD design using otherwise routine experimentation based, for example, on tests conducted with sample SSDs running sample ML models on sample input data. In some examples, the controller may then adaptively adjust the threshold based on actual measured host session times in an effort to maximize processing speed while minimizing risk of loss of data.

Figure 5:
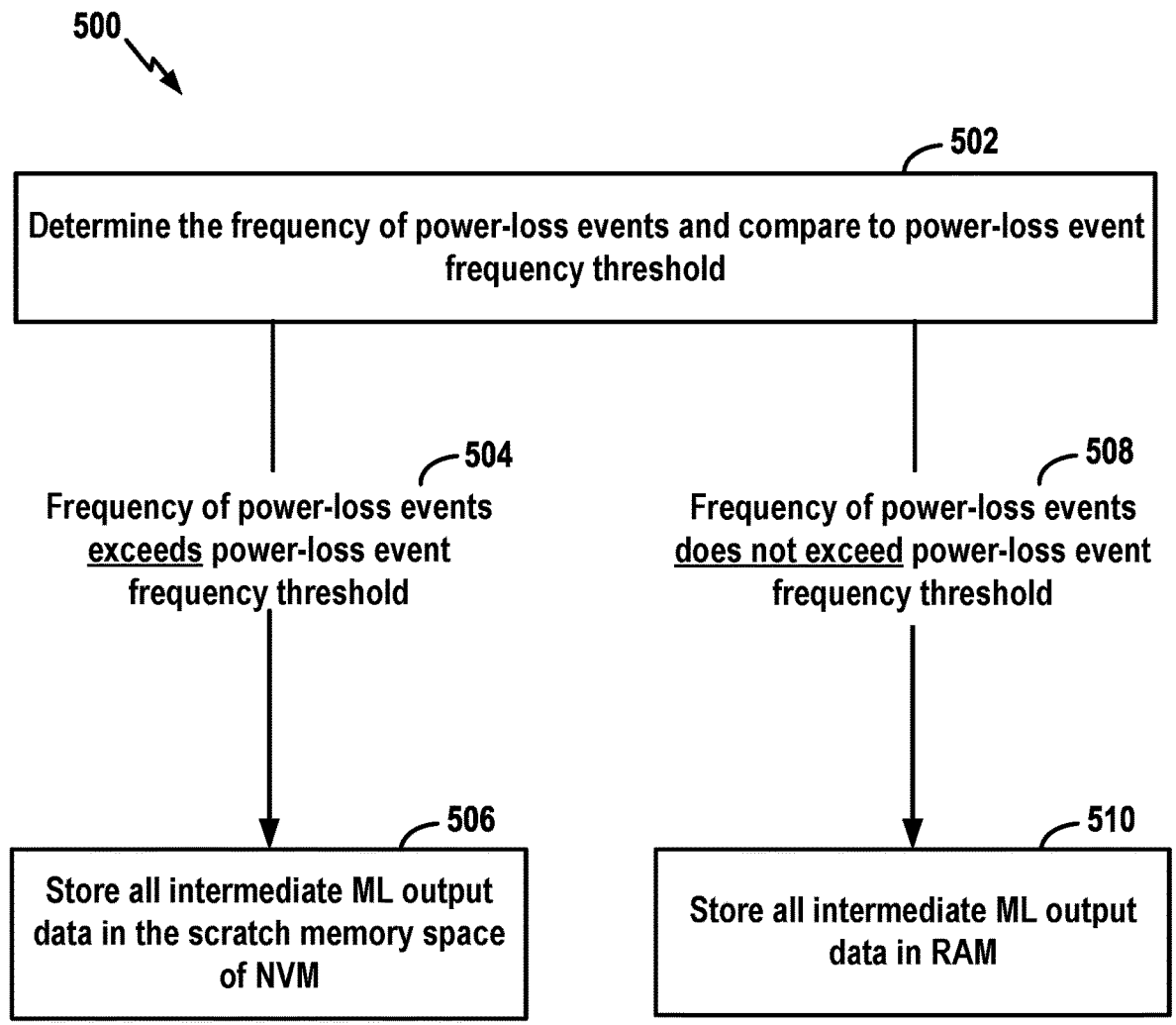
FIG. 5 illustrates an exemplary method for use with ML processing, wherein resource arbitration is performed based on power-loss event frequency.

FIG. 5 illustrates an exemplary method 500 for use with ML processing according to aspects of the present disclosure wherein RAM/NVM resource arbitration is performed based on power-loss event frequency. Beginning at block 502, a controller (such as the controller 222 of the resource usage controller 216 of FIG. 2) determines or measures the frequency of power-loss events (e.g., how often the SSD is powered down for one reason or another) and compares the frequency to a power-loss event frequency threshold. If, as indicated at 504, the frequency of power-loss events exceeds the power-loss event frequency threshold then, at block 506, all intermediate ML output data from the ML controller is stored in the scratch space memory of the NVM. That is, all such data is stored in NVM due to a relatively high risk that the ML data will be lost due to power cycling. Conversely, if, as indicated by 508, the frequency of power-loss events does not exceed the power-loss event frequency threshold then, at block 510, all intermediate ML output data from the ML controller is stored in RAM. That is, in this case, all such data is stored in RAM due to relatively little risk that the ML data will be lost due to power cycling. A suitable initial value for the power-loss event frequency threshold may be determined in advance by engineers during SSD design using otherwise routine experimentation based, for example, on tests conducted with sample SSDs running sample ML models on sample input data. In some examples, the controller may then adaptively adjust the threshold based on actual measured power-loss event frequencies in an effort to maximize processing speed while minimizing risk of loss of data.

Figure 6:
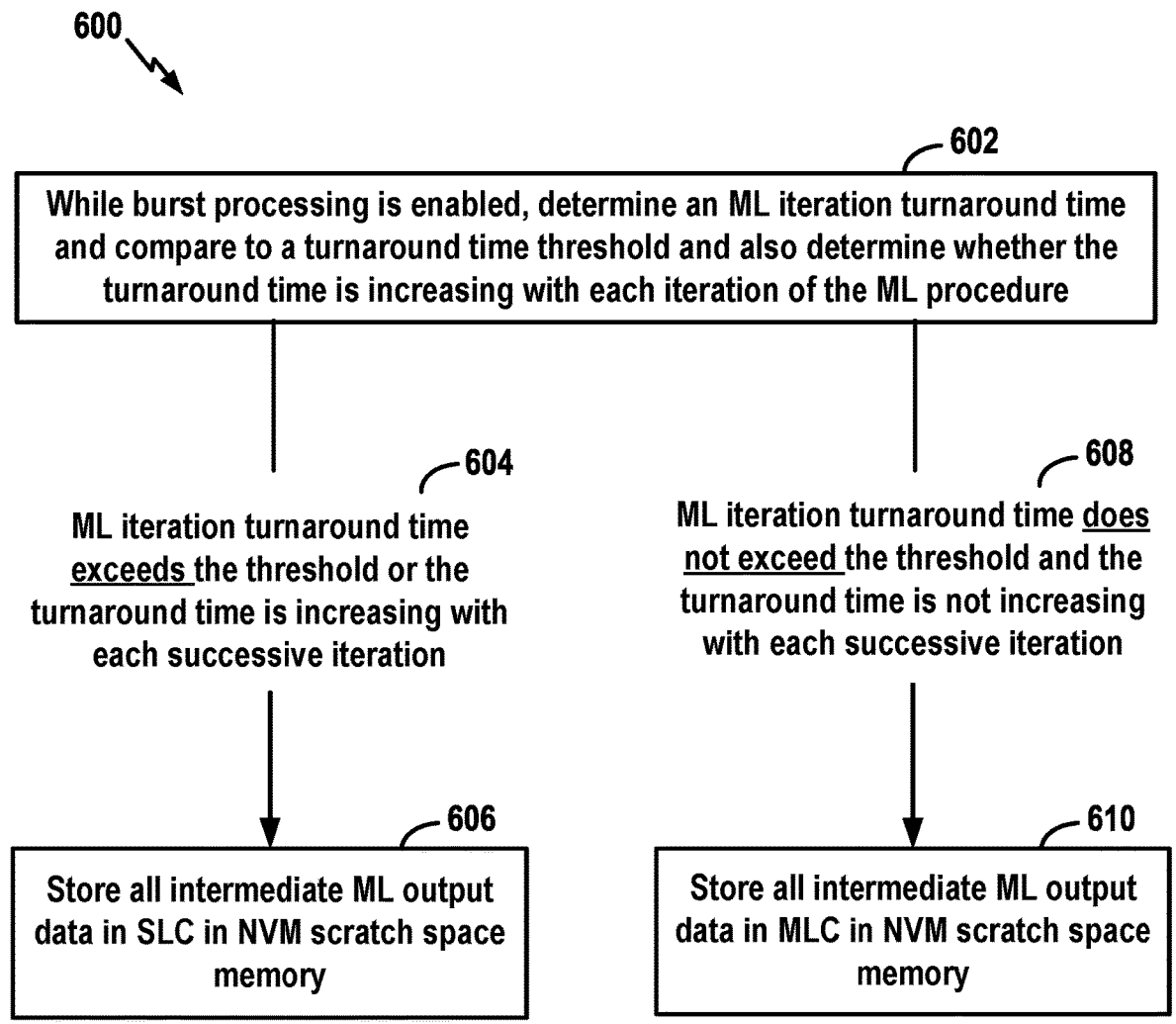
FIG. 6 illustrates an exemplary method for use with ML processing, wherein resource arbitration is performed for use with burst processing.

FIG. 6 illustrates an exemplary method 600 for use with ML processing according to aspects of the present disclosure wherein RAM/NVM resource arbitration is performed while burst processing is enabled. Beginning at block 602, while burst processing is enabled, a controller (such as the controller 222 of the resource usage controller 216 of FIG. 2) determines or measures the ML iteration turnaround time (as discussed above) and compares the turnaround time a turnaround time threshold (as also discussed above). At 602, the controller also determines whether the turnaround time is increasing with each successive iteration. If, as indicated at 604, the ML iteration turnaround time exceeds the threshold or the turnaround time is increasing with each successive iteration then, at block 606, all intermediate ML output data from the ML controller is stored in SLC in the NVM scratch space memory. That is, all such data is stored in SLC since, as explained above, the cost to allocate SLC scratch space in an NVM for long turnaround times is often outweighed by the speed advantages of utilizing SLC for burst storage operations. Conversely, if, as indicated by 608, the ML iteration turnaround time does not exceed the threshold and the turnaround time is not increasing with each successive iteration then, at block 610, all intermediate ML output data from the ML controller is stored in MLC in the scratch memory space of the NVM. That is, in this case, all such data is stored in MLC (or, as noted above, as SLC in MLC) since the cost to allocate SLC scratch space for relatively short turnaround times is not outweighed by any speed advantages of SLC for burst storage.

Figure 7:
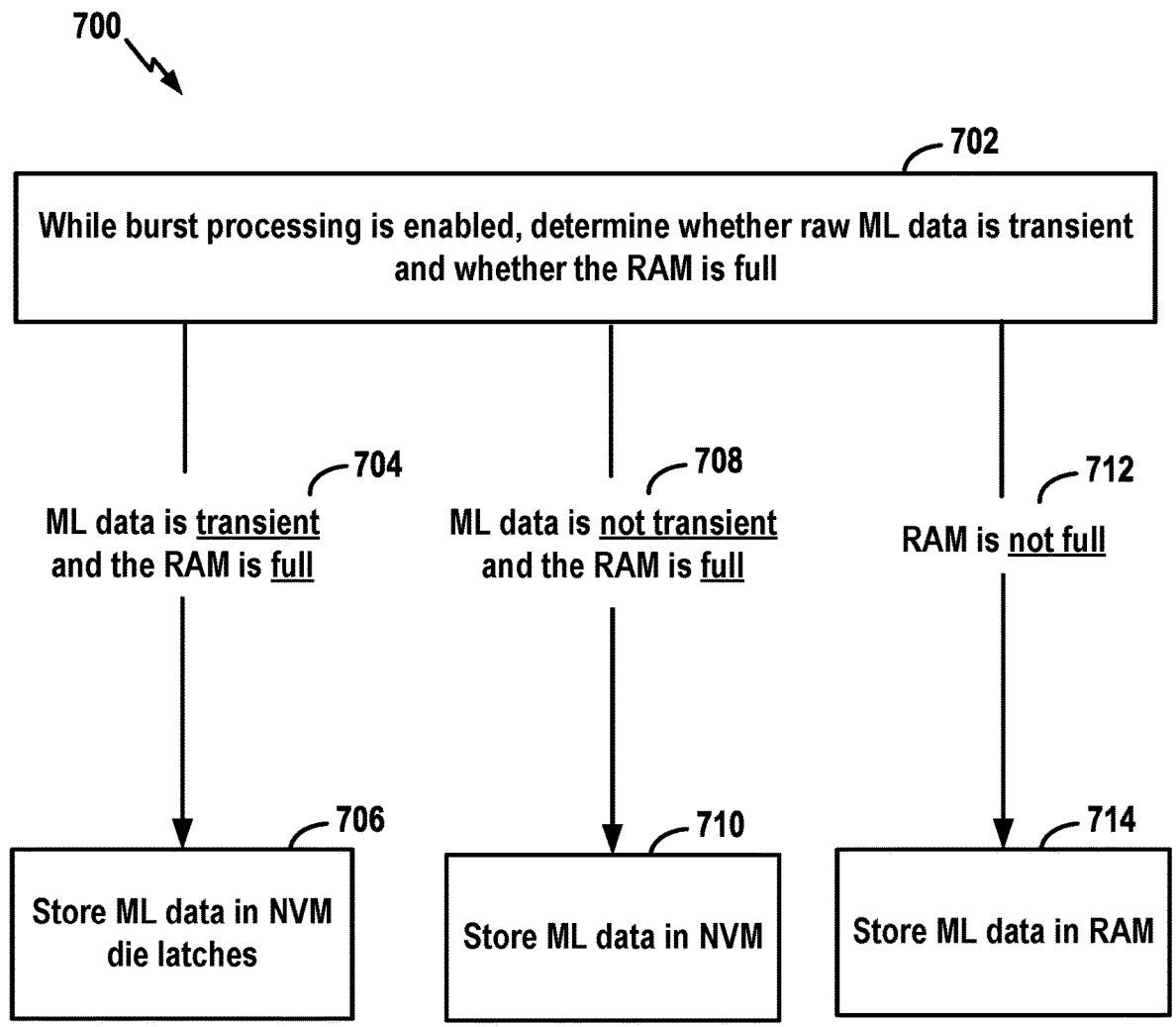
FIG. 7 illustrates an exemplary method for use with ML processing, wherein resource arbitration is performed on transient data during burst processing.

FIG. 7 illustrates another exemplary method 700 for use with ML processing according to aspects of the present disclosure wherein RAM/NVM resource arbitration is performed while burst processing is enabled. Beginning at block 702, while burst processing is enabled, a controller (such as the controller 222 of the resource usage controller 216 of FIG. 2) determines whether raw ML data received from the host is transient and whether the RAM is full (or otherwise lacks sufficient space to store the transient data). If, as indicated at 704, the ML data is transient and the RAM is full (or otherwise lacks sufficient space to store the transient data) then, at block 706, the transient ML data is stored in latches in the NVM (such as latches 219 of FIG. 2). That is, the data is stored in the latches since the RAM is full and, since the data is transient, there is no need to store in NVM. If, as indicated by 708, the RAM is full and the data is transient, then, at block 710, the ML data is stored in NVM. Finally, if, as indicated by 712, the RAM is not full then, at block 710, the ML data can be stored in RAM since space is available (and the device need not distinguish between transient or non-transient data). In other examples, the features of FIG. 7 may be implemented for non-burst processing as well.

Figure 8:
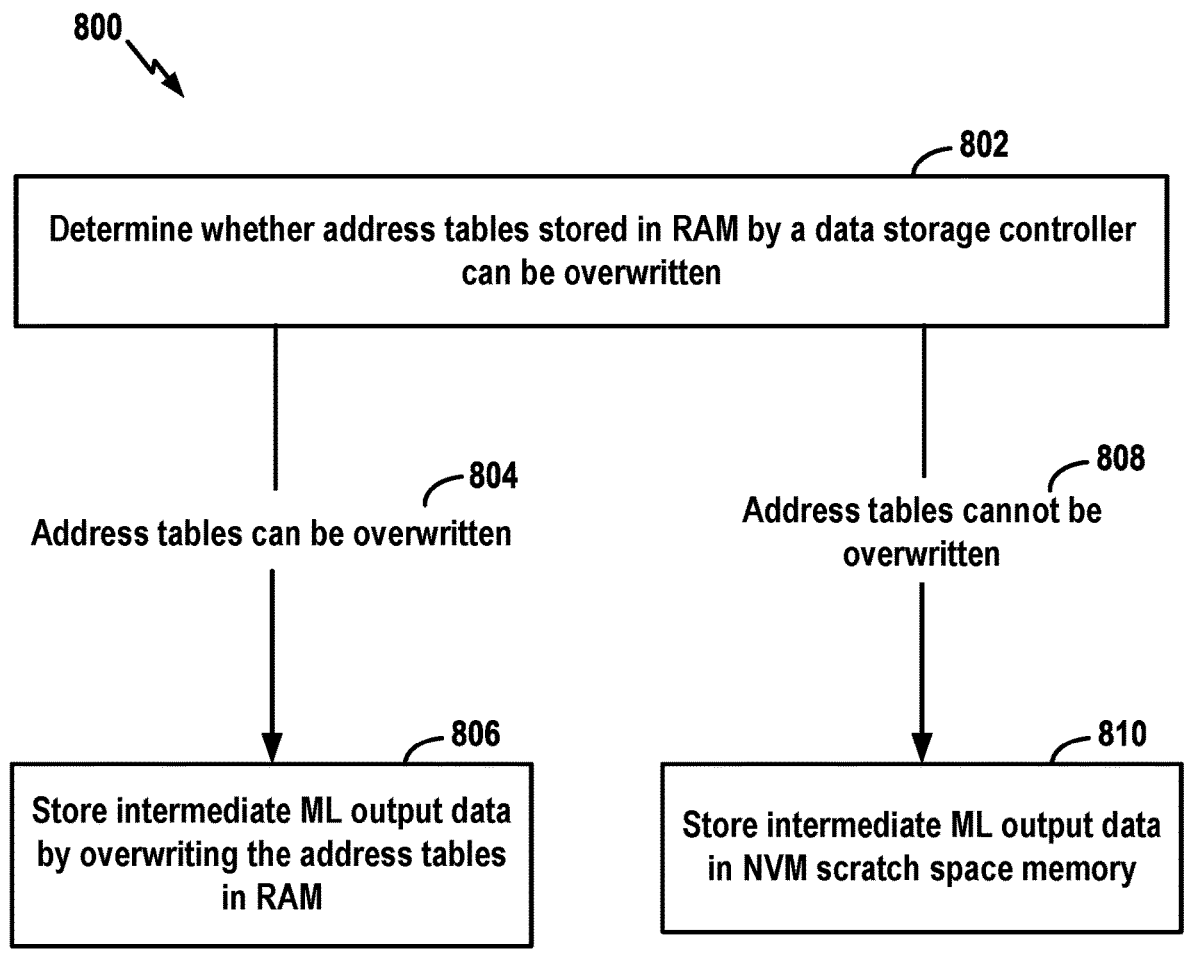
FIG. 8 illustrates an exemplary method for use with ML processing, wherein resource arbitration is performed in connection with address table storage.

FIG. 8 illustrates an exemplary method 800 for use with ML processing according to aspects of the present disclosure wherein RAM/NVM resource arbitration is performed in connection with address table storage. Beginning at block 802, a controller (such as the controller 222 of the resource usage controller 216 of FIG. 2) determines whether address tables stored in RAM can be overwritten. The address tables may be, e.g., tables that related logical address received from a host to physical addresses in an NVM array. For example, the controller may confirm that the address tables in RAM are only a cached version of tables that are also stored in NVM (and hence can be recovered from NVM and re-stored in RAM later) or that the information in the tables can otherwise be recreated. If, as indicated at 804, the address tables can be overwritten in RAM then, at block 806, intermediate ML output data from the ML controller is stored in the portion of the RAM previously reserved for the address tables, i.e., the tables are overwritten. Conversely, if, as indicated by 808, the address tables cannot be overwritten, perhaps because they are currently in use by the data storage controller or there is no satisfactory backup, then, at block 810, the intermediate ML output data is stored in the scratch memory space of the NVM. Moreover, if other portions of the RAM are available, then the ML data may be stored in those other portions of RAM. That is, the procedure of FIG. 8 is primarily intended for use in circumstances where the rest of the RAM is full (perhaps with other ML data).

Figure 9:
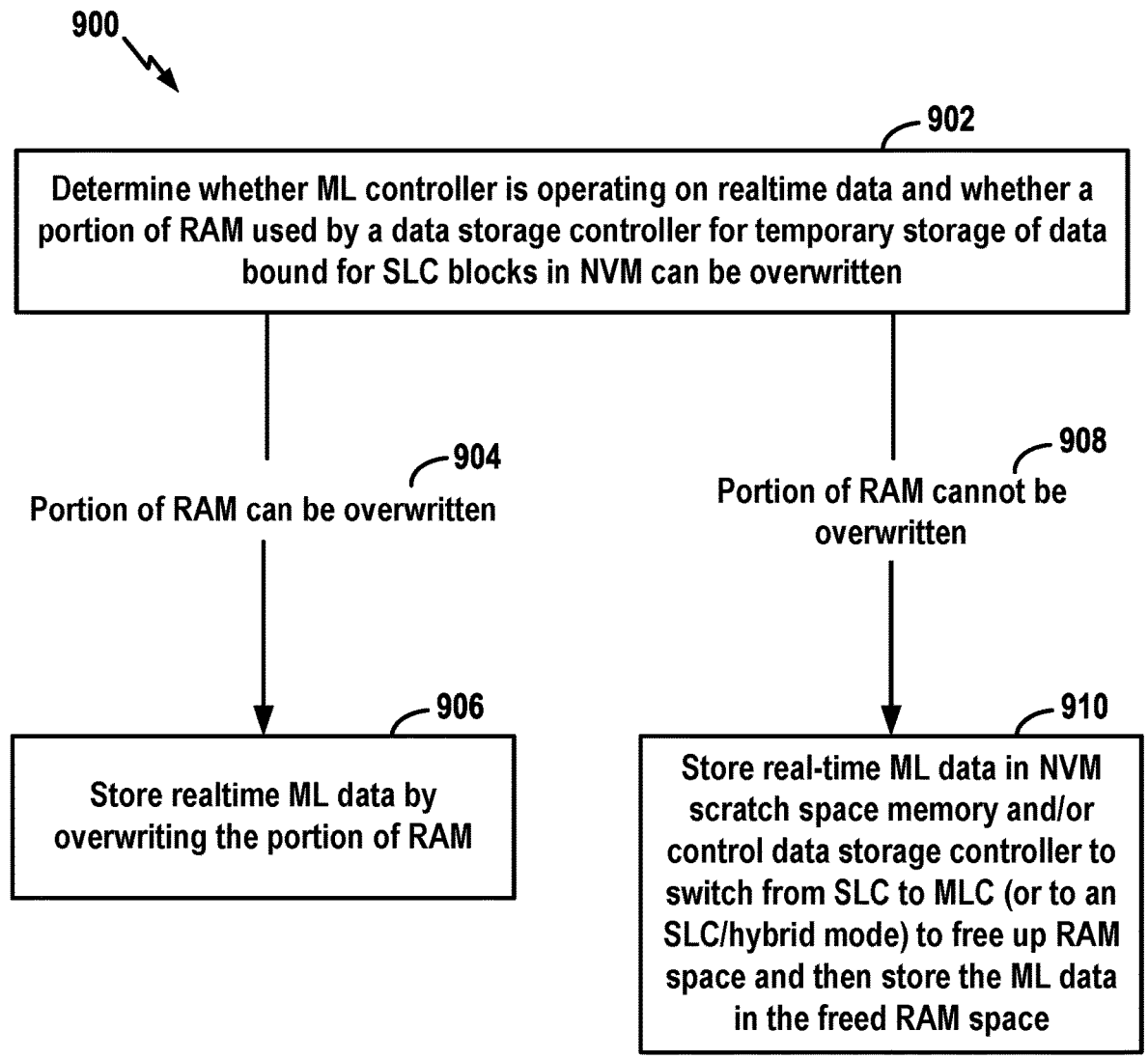
FIG. 9 illustrates an exemplary method for use with ML processing, wherein resource arbitration is performed in connection with single level cell (SLC)/multi-level cell (MLC) storage.

FIG. 9 illustrates an exemplary method 900 for use with ML processing according to aspects of the present disclosure wherein RAM/NVM resource arbitration is performed in connection with SLC/MLC storage operations. Beginning at block 902, a controller (such as the controller 224 of the resource usage controller 216 of FIG. 2) determines whether ML data is realtime data and whether a portion of RAM used for temporary storage of data bound for SLC blocks in NVM can be overwritten. For example, the controller may confirm that no data bound for SLC blocks is currently be processed by the data storage controller. If, as indicated at 904, the portion of RAM can be overwritten then, at block 906, the realtime ML data is stored in the portion of the RAM previously reserved for SLC data. Conversely, if, as indicated by 908, the portion of RAM cannot be overwritten, perhaps because there are on-going SLC writes, then, at block 910, the real time ML data is stored scratch memory space of the NVM. Additionally or alternatively, at block 910, the controller can direct data storage controller to switch from SLC to MLC (or to switch to the SLC/hybrid mode) to free up RAM space and then store the ML data in the freed RAM space. Although not shown in FIG. 9, if the ML data is not real time data, and hence not time-critical, the data may be stored in NVM. Moreover, if other portions of the RAM are available, then the ML data (whether real time or otherwise) may be stored in those other portions of RAM. That is, the procedure of FIG. 9 is primarily intended for use in circumstances where the rest of the RAM is full.

Figure 10:
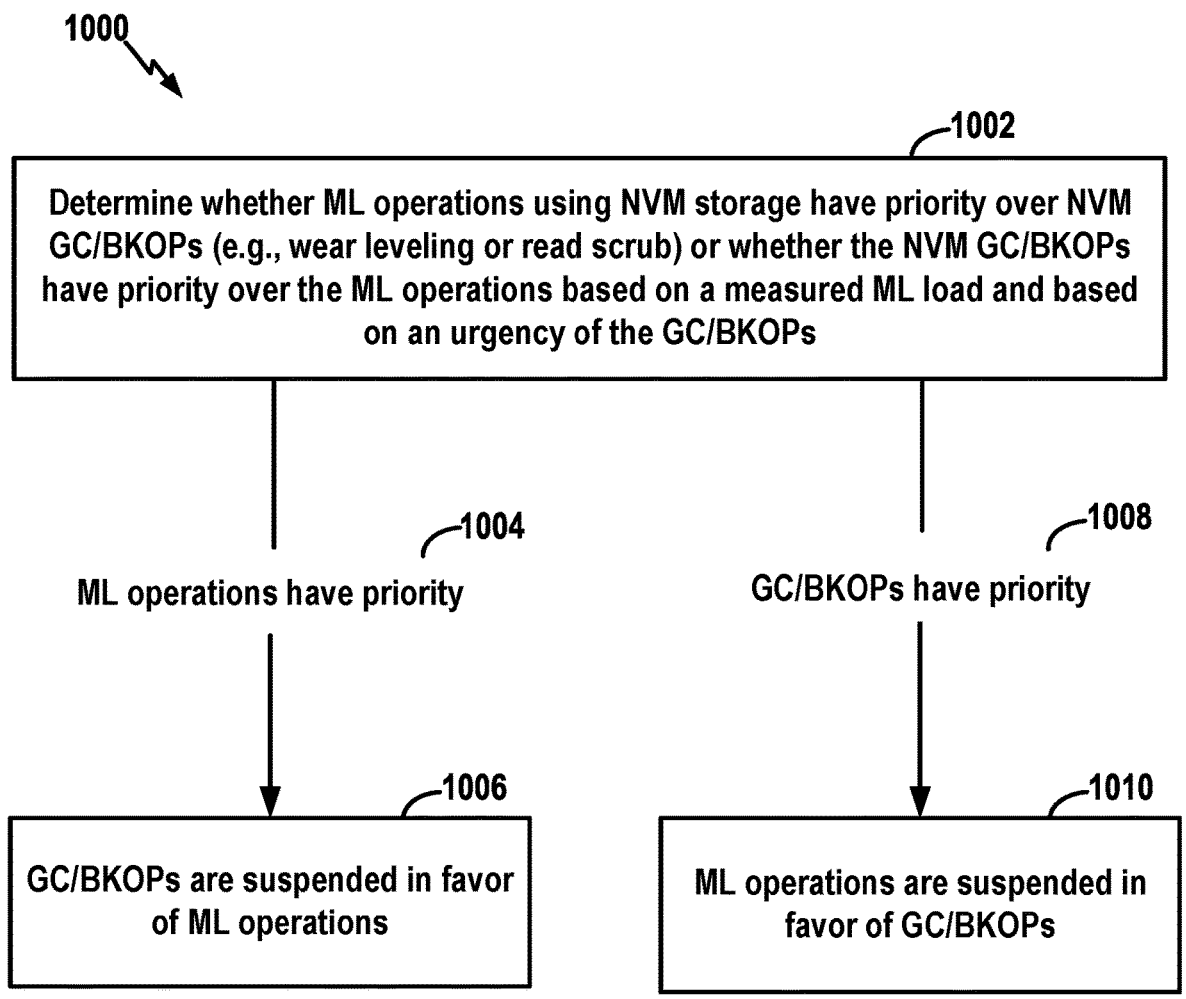
FIG. 10 illustrates an exemplary method for use with ML processing, wherein resource arbitration is performed in connection with garbage collection and background operations.

FIG. 10 illustrates an exemplary method 1000 for use with ML processing according to aspects of the present disclosure wherein resource arbitration is performed in connection with GC/BKOPs. Beginning at block 1002, a controller (such as the controller 226 of the resource usage controller 216 of FIG. 2) determines whether ML operations using NVM storage have priority over NVM GC/BKOPs (e.g., wear leveling or read scrub performed by the data storage controller) or whether the GC/BKOPs have priority over the ML/NVM operations. The prioritization can be assessed based, e.g., on a measured ML load and on a relative urgency of GC/BKOPs.

For example, the ML load may be measured or otherwise determined based on information provided by the ML controller and compared against an ML load threshold to thereby assess the relative priority of the ML operations. The urgency of GC or BKOPs may be determined based on information provided by the data GC/BKOPs components of the data storage controller (such as component 227 of FIG. 2). For example, the data storage controller may designate particular GC/BKOPs as critical if the NVM is running out of blocks. In an illustrative example, if the ML load exceeds the ML load threshold but the GC/BKOPs are not urgent or critical, the ML operations are deemed to have priority.

If the ML load does not exceed the ML load threshold and the GC/BKOPs are urgent or critical, the GC/BKOPs operations are deemed to have priority. If the ML load exceeds the ML load threshold and the GC/BKOPs are critical, the critical GC/BKOPs operations are deemed to have priority. If the ML load does not exceed the ML load threshold and the GC/BKOPs are not urgent or critical, then ML operations may be given priority even though the ML load is not high. Note that the foregoing prioritization is employed for ML operations that involve storing ML data in NVM blocks where the storage of ML data in the NVM can conflict with GC/BKOPs performed on those NVM blocks. If the ML data is to be stored in RAM, then prioritization is not performed. If the ML data can be stored in NVM blocks that are not affected by the GC/BKOPs, then is not performed. Accordingly, the ML load may be measured in connection with the NVM storage needs of the ML controller. As explained above, in some examples, different ML load thresholds may be set for suspending wear leveling as opposed to read scrub.

If, as indicated at 1004, the ML operations have priority over the GC/BKOPs then, at block 1006, the GC/BKOPs are suspended (or withheld or delayed) in favor of ML operations. Once the ML load falls below the threshold (or NVM storage is not required by the ML controller), the GC/BKOPs can be performed. Conversely, if, as indicated by 1008, the GC/BKOPs have priority over the ML operations, then, at block 1010, ML operations are suspended (or delayed) in favor of the GC/BKOPs. Once the GC/BKOPs are completed, the ML operations can resume. If ML data can be safely stored elsewhere, such as in RAM, then ML operations can continue while GC/BKOPs are performed. For example, as explained above, ML data already stored in NVM can be read back from the NVM and stored in RAM. The controller 226 can also tune the ML controller to utilize available processing time slices or available NVM storage blocks without affecting the BKOPs.

Figure 11:
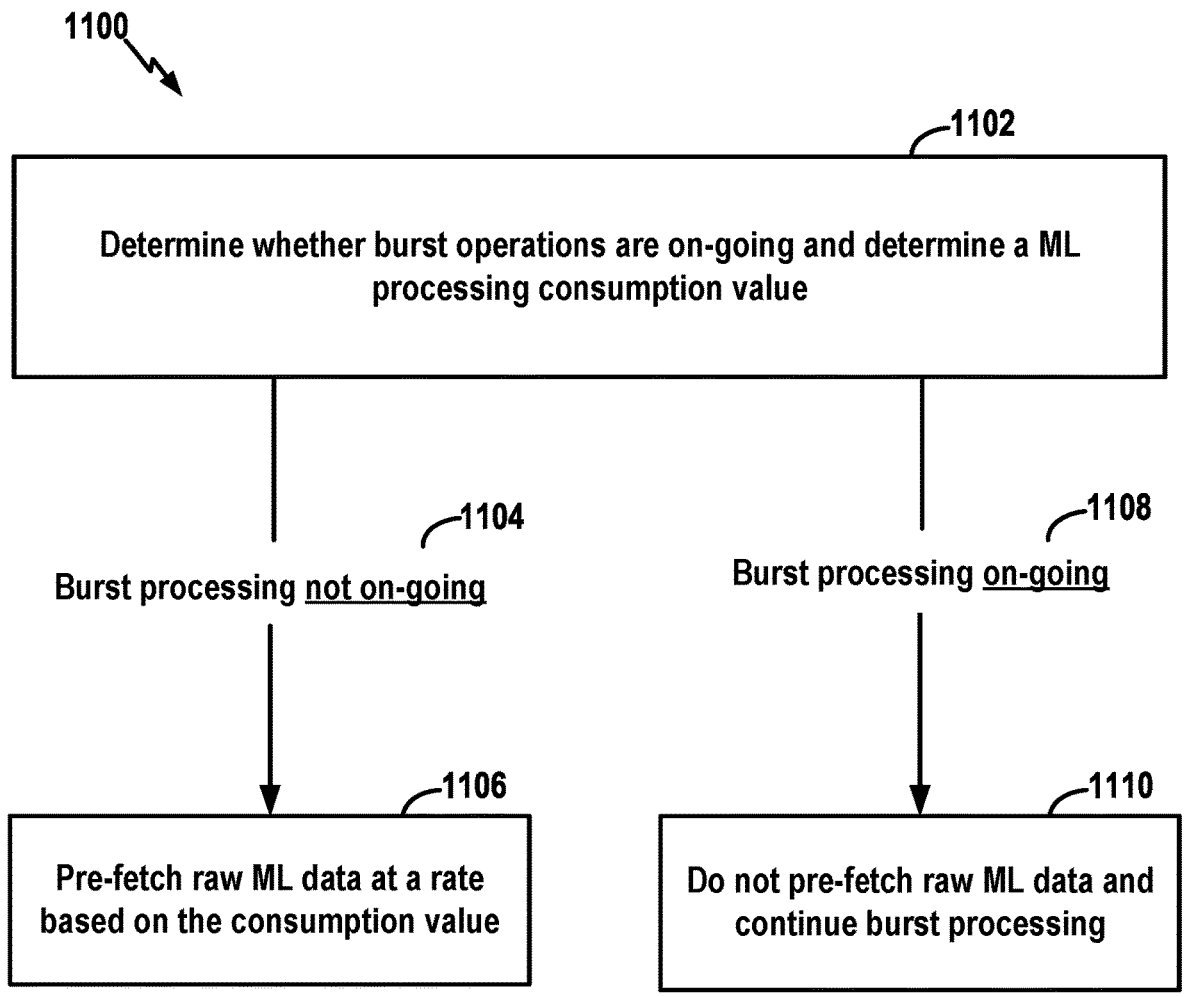
FIG. 11 illustrates an exemplary method for use with ML processing, wherein resource arbitration is performed in connection with pre-fetch.

FIG. 11 illustrates an exemplary method 1100 for use with ML processing according to aspects of the present disclosure wherein resource arbitration is performed in connection with pre-fetch. Beginning at block 1102, a controller (such as the controller 228 of the resource usage controller 216 of FIG. 2) determines whether ML burst operations are on-going or are otherwise required (e.g., the data storage controller is obtaining data from a host via burst commands and promptly storing that data in the NVM as part of the burst transfer process). At block 1102, the controller also determines or assesses the ML processing rate of the ML controller, e.g., how much raw ML data is being processed per unit of time. This may be determined based on information provided by the ML controller. If, as indicated at 1104, burst processing is not ongoing then, at block 1106, the ML controller is directed to pre-fetch raw ML data at a rate set based on the consumption value. In one example, if raw data is processed at 1 Mbyte per second, then data may be pre-fetched at that same rate. In some examples, the data is pre-fetched from a host. However, if the data is already stored on the NVM, the data may be pre-fetched from the NVM. Conversely, if, as indicated by 1108, the burst processing is on-going (or otherwise required), then pre-fetch is not performed and the SSD continues burst processing of data received from the host at block 1110. As noted above, data chunks being pre-fetched can be either be fetched entirely onto the RAM (if there is low storage activity in the RAM) or can be pulled to temporary SLC blocks in the NVM from the host or from MLC blocks of the NVM (assuming that raw ML data being pre-fetched is already stored in the MLC blocks).

Figure 12:
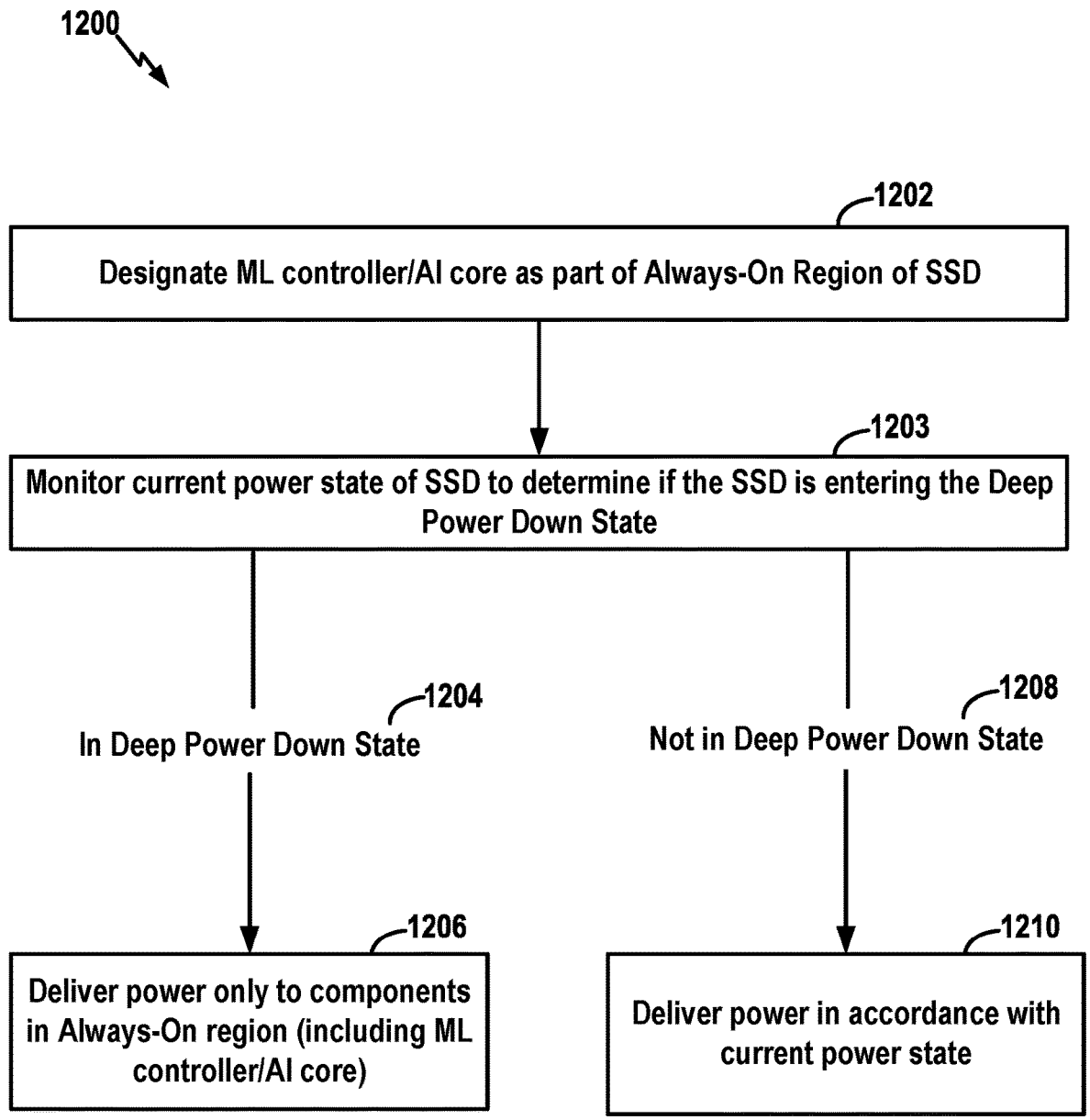
FIG. 12 illustrates an exemplary method for use with ML processing, wherein resource arbitration is performed in connection with power states.

FIG. 12 illustrates an exemplary method 1200 for use with ML processing according to aspects of the present disclosure wherein resource arbitration is performed in connection with power states. Beginning at block 1202, a controller (such as the controller 230 of the resource usage controller 216 of FIG. 2) designates the ML controller (or at least its AI core) as part of Always-On Region of SSD. In other examples, the designation may be made by device hardware during bootup of the SSD. At block 1203, the controller monitors the current power state of the SSD to determine if the SSD is entering the Deep Power Down State (e.g., the lowest power state available). If, as indicated at 1204, the device is entering or is in the Deep Power Down State, then, at block 1206, the power is delivered only to those components of the SSD that are designated in the Always-On region, including ML controller (or, at least, its AI core). Conversely, if, as indicated by 1208, the device is not in the Deep Power Down State, power is delivered at block 1210 in accordance with the current power state. Depending upon the particular SSD, a variety of states may be defined, including an Active state in which no power reduction to any SSD component is performed since host commands are in progress and an Idle Time mode where power is still available to the components of the SSD without host commands in progress.

Figure 13:
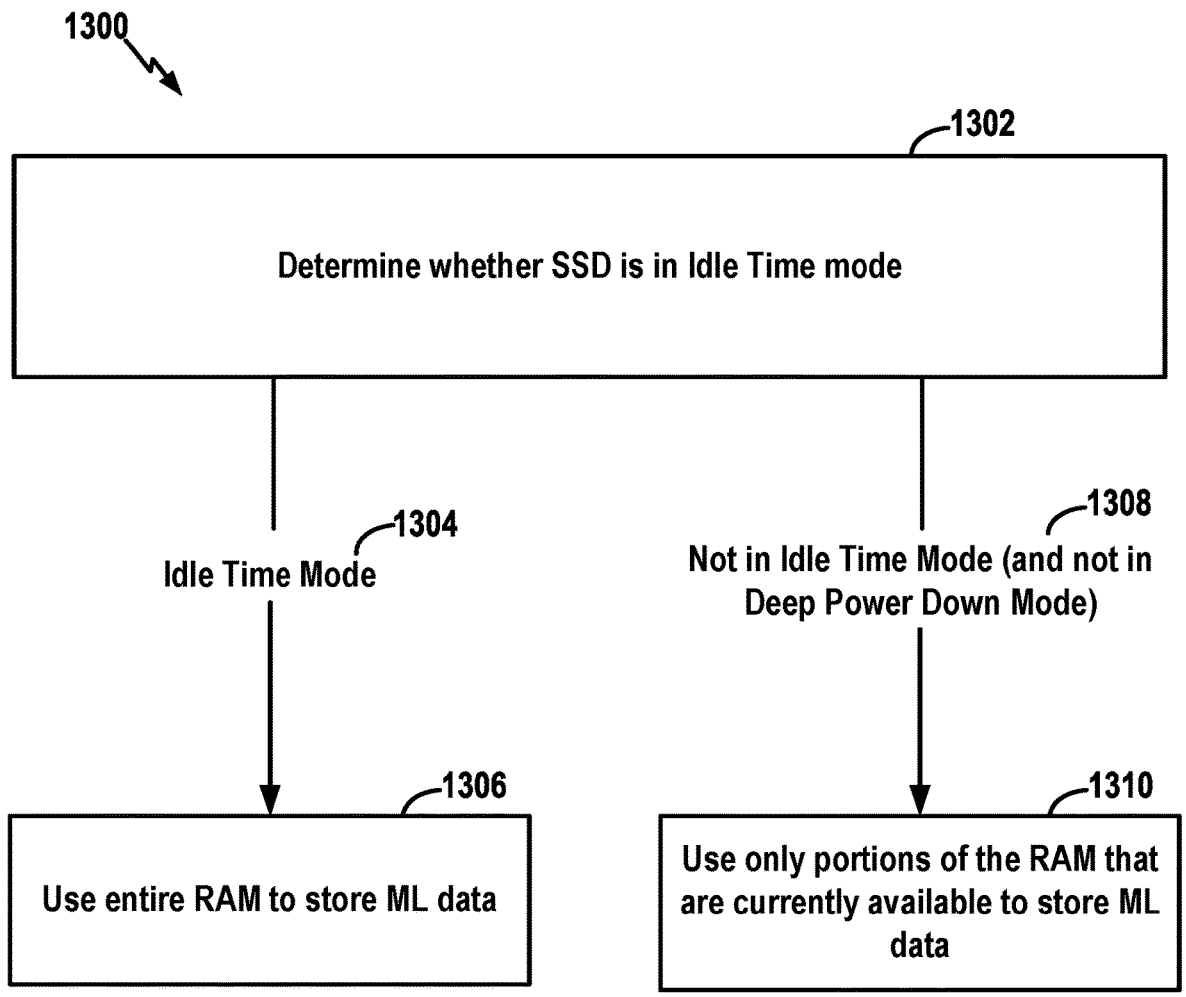
FIG. 13 illustrates an exemplary method for use with ML processing, wherein resource arbitration is performed in connection with an idle time mode.

FIG. 13 illustrates an exemplary method 1300 for use with ML processing according to aspects of the present disclosure wherein resource arbitration is performed in connection with an Idle Time mode. Beginning at block 1302, a controller (such as the controller 232 of the resource usage controller 216 of FIG. 2) determines whether the SSD is in the Idle Time mode (e.g., a mode where power is still available to the components of the SSD without host commands in progress). If, as indicated at 1304, the SSD is in Idle Time mode then, at block 1306, the ML controller is directed to use the entire RAM (or at least a larger portion of the RAM than would be used when not in Idle Time) to store ML data (since, with no on-going host commands, the other components of the device will not be using the RAM or, at least, will not be using as much of the RAM). Conversely, if, as indicated by 1308, the SSD is not in Idle Time Mode (and also not in the aforementioned Deep Power Down Mode), then, at block 1310, the ML controller is directed to use only portions of the RAM that are currently available to store ML data. If insufficient RAM is available, the ML data may be stored in the NVM.

Figure 14:
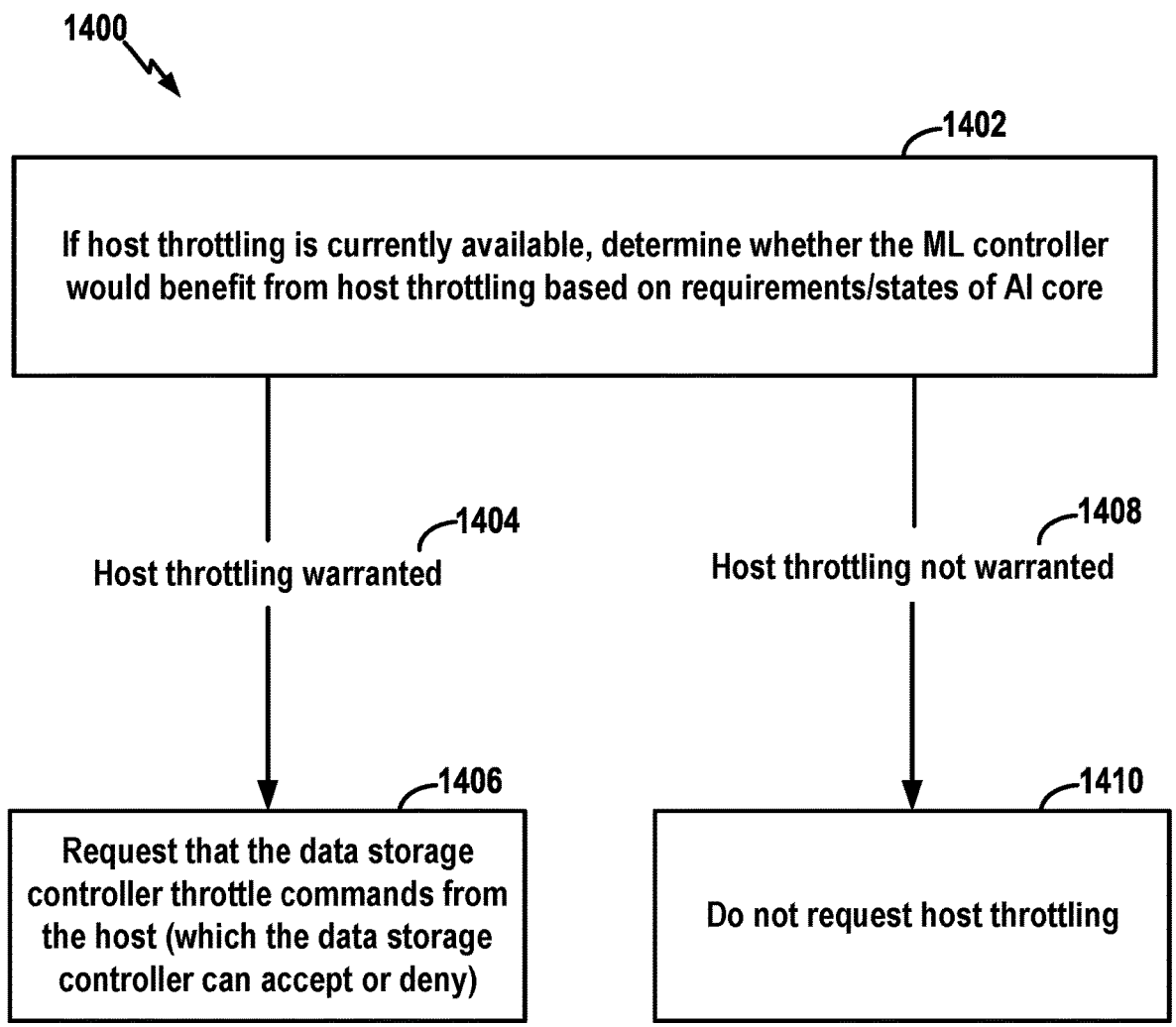
FIG. 14 illustrates an exemplary method for use with ML processing, wherein resource arbitration is performed in connection with host throttling.

FIG. 14 illustrates an exemplary method 1400 for use with ML processing according to aspects of the present disclosure wherein resource arbitration is performed in connection with host throttling. Beginning at block 1402, if host throttling is supported by the SSD and currently available, a controller (such as the controller 234 of the resource usage controller 216 of FIG. 2) determines whether throttling would benefit the ML controller based, e.g., on any requirements of the AI core or its current processing state. By way of example, if the current AI processing state is one which requires additional processing time, it may be beneficial to throttle the host to slow down the provision of new raw ML data. For instance, one of the various ML parameters discussed above, such as ML load, can be compared to a suitable threshold and, if the parameter exceeds the threshold, throttling is thereby determined to be warranted. Otherwise, throttling is not deemed warranted.

If, as indicated at 1404, host throttling is warranted then, at block 1406, a request is sent to the throttling controller of the data storage controller (e.g., to host throttling component 235 of FIG. 2) to request that the data storage controller throttle commands from the host (which the data storage controller can then accept or deny). Assuming the request is accepted, host throttling is activated. Later, once host throttling is no longer required, a request may be sent to the data storage controller to deactivate throttling. In some examples, a particular amount of throttling may be requested. If throttling is denied, perhaps because throttling would conflict with other functions performed by the data storage controller, then throttling is not activated at 1406. If, as indicated by 1408, host throttling is not warranted then, at block 1410, no request for throttling is sent to the data storage controller.

Figure 15:
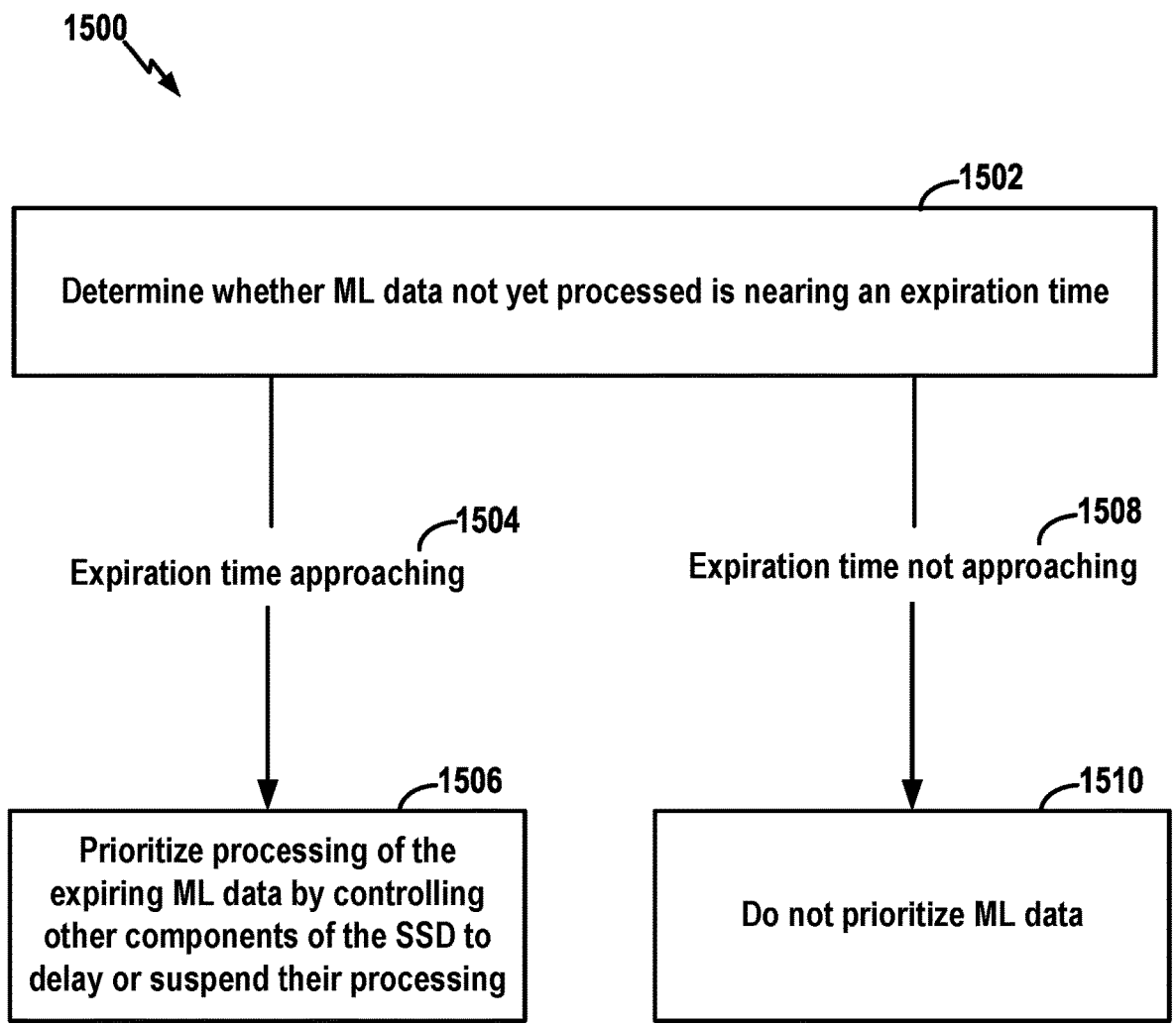
FIG. 15 illustrates an exemplary method for use with ML processing, wherein resource arbitration is performed in connection with data expiration times.

FIG. 15 illustrates an exemplary method 1500 for use with ML processing according to aspects of the present disclosure wherein resource arbitration is performed in connection with expiration times. Beginning at block 1502, a controller (such as the controller 236 of the resource usage controller 216 of FIG. 2) determines whether ML data not yet processed is nearing an expiration time. As explained above, expiration times may be assessed based on time stamps provided with the data or, in some examples, based on hints and metadata. If, as indicated at 1504, the expiration time for data is approaching then, at block 1506, the processing of the expiring ML data is prioritized by controlling other components of the SSD to delay or suspend their processing. For example, other components that may also wish to use the RAM may be suspended so that the ML controller can use more of the RAM to store intermediate ML data to thereby expedite processing (as compared to having to store the data in NVM and retrieve the data from the NVM). Conversely, if, as indicated by 1508, an expiration time is not approaching then, at block 1510, ML data processing is not prioritized.

Figure 16:
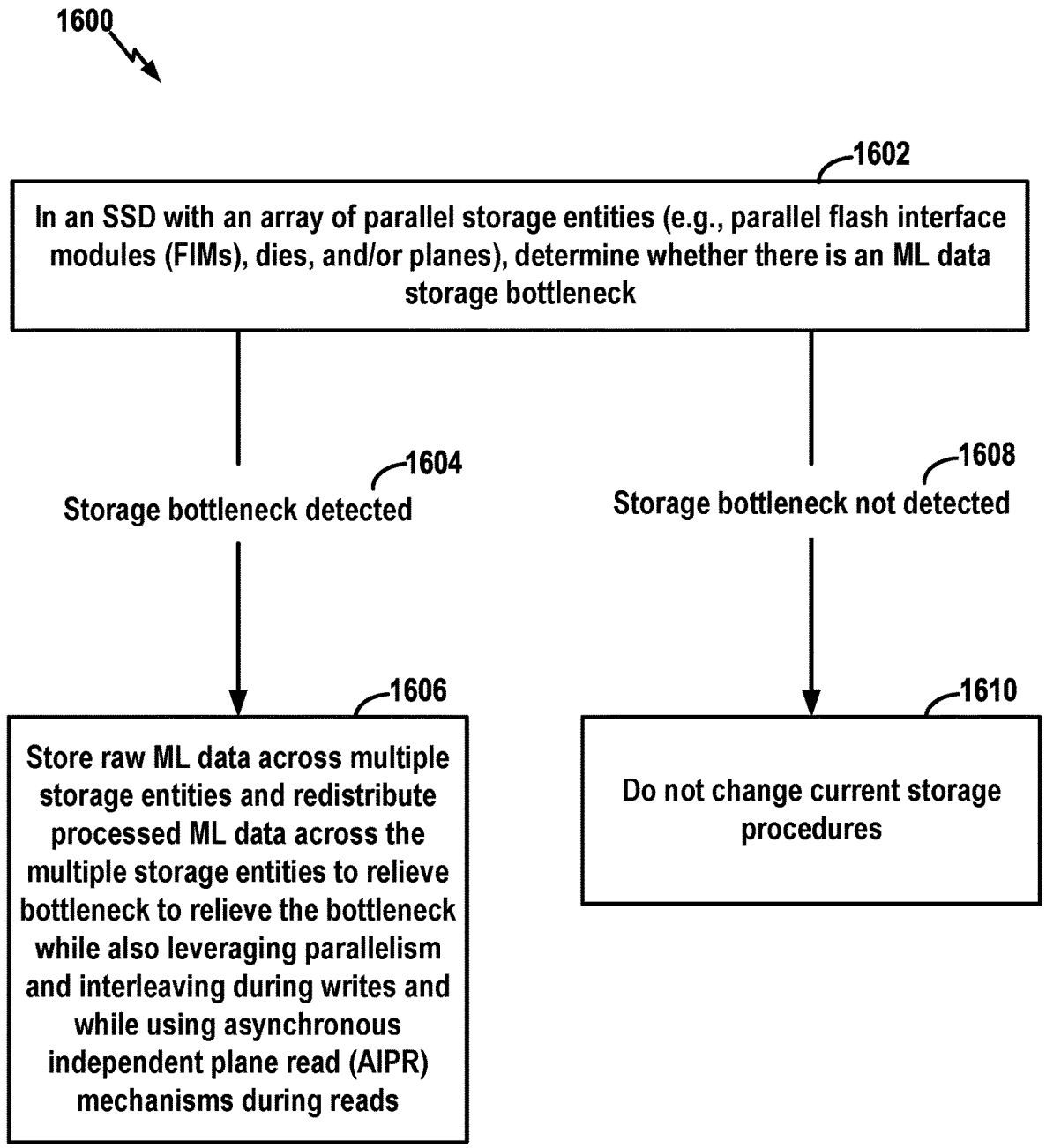
FIG. 16 illustrates an exemplary method for use with ML processing, wherein resource arbitration is performed in connection with parallel storage entities.

FIG. 16 illustrates an exemplary method 1600 for use with ML processing according to aspects of the present disclosure wherein resource arbitration is performed in connection with parallel storage entities. In an SSD with an array of parallel storage entities (e.g., parallel FIMs, dies, and/or planes), beginning at block 1602, a controller (such as the controller 238 of the resource usage controller 216 of FIG. 2) detects an ML data storage bottleneck. This may be done, for example, by detecting abnormally slow NVM storage and retrieval times (by, e.g., comparing such times to suitable thresholds). If, as indicated at 1604, a storage bottleneck is detected then, at block 1606, the controller directs other components of the SSD to store new raw ML data across multiple storage entities (e.g., across multiple NAND dies) and to redistribute at least some processed ML data across the multiple storage entities (by, e.g., retrieving data from one NAND die and transferring it to another) to relieve the bottleneck while also leveraging parallelism and interleaving during writes and using AIPR mechanisms during reads. Conversely, if, as indicated by 1608, no storage bottleneck is detected then, at block 1610, current storage procedures are not modified or changed.

Among other possible advantages, the features described herein can help to (1) optimize resource usage between the data storage controller ASIC and the AI accelerator of the ML controller, which helps keeping product cost in check; (2) meet power requirements for storage and AI/ML in the same controller; and (3) track the average iteration time for various trained models to and apply optimizations in advance in subsequent runs. Moreover, the system does not require processing of raw data of an ML procedure across power-cycle events, and hence is removable-product friendly. That is, techniques are provided for efficiently storing ML data in NVM so that power cycling does not erase the data.

Additional Exemplary Methods and Apparatus

Figure 17:
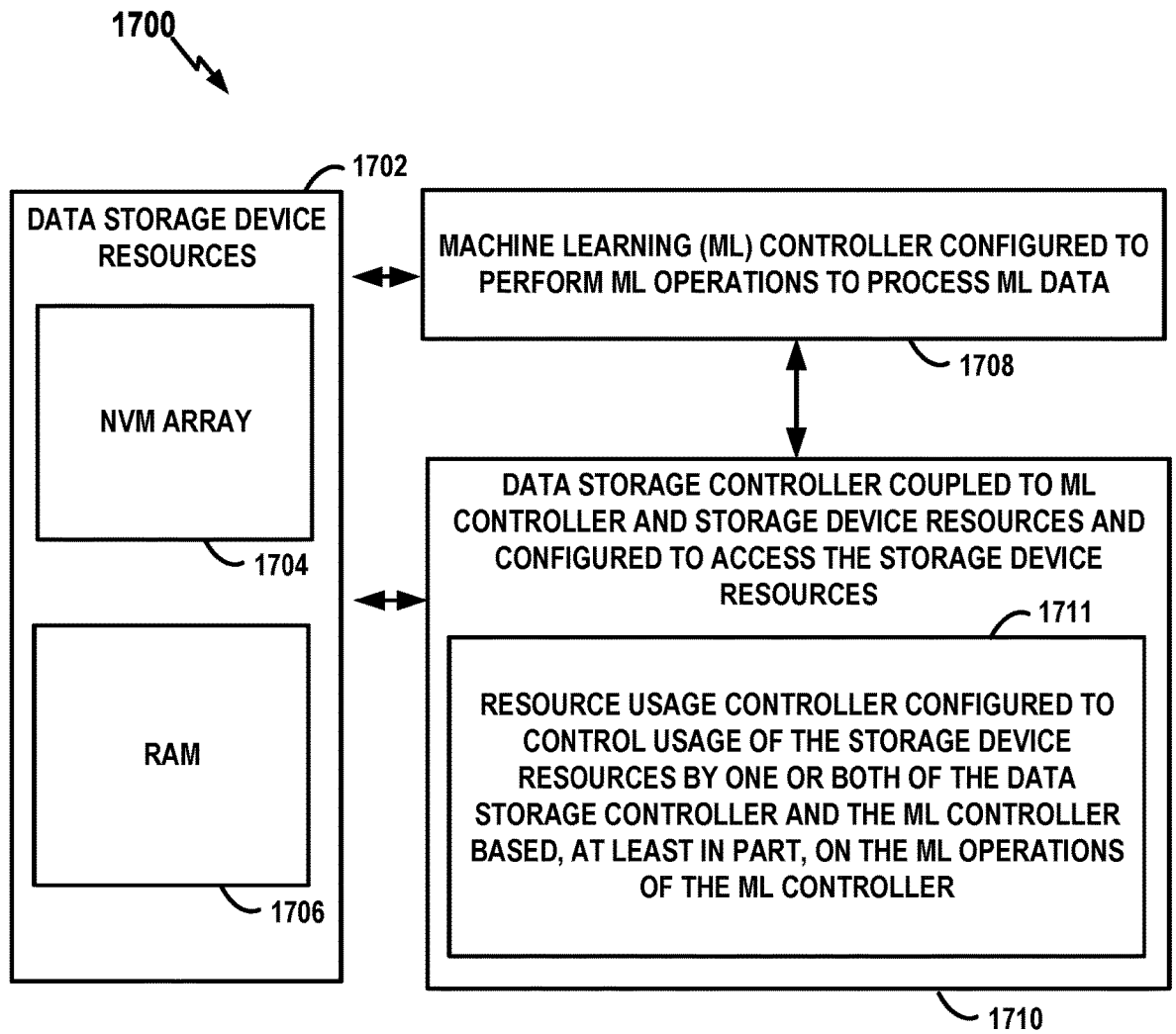
FIG. 17 is a schematic block diagram configuration for an exemplary DSD having an ML controller, a data storage controller, data storage device resources, and a resource usage controller.

FIG. 17 illustrates an embodiment of an apparatus 1700 configured according to one or more aspects of the disclosure. The apparatus 1700, or components thereof, could embody or be implemented within any suitable apparatus or device capable of performing the operations, such as a DSD having a data storage controller and a separate ML controller. The apparatus 1700 includes data storage device resources 1702 including an NVM array 1704 (which may include ML data scratch space) and a RAM 1706. The apparatus 1700 also includes an ML controller 1708 configured to perform ML operations to process ML data and a data storage controller 1710 coupled to the ML controller 1807 and the storage device resources 1702 and configured to access the storage device resources 1702. In some examples, as shown, the ML controller 1708 is also coupled to the storage device resources 1702. In other examples, the ML controller 1708 only accesses the storage device resources 1702 via the data storage controller 1710. The apparatus 1700 also includes a resource usage controller 1711 configured to control usage of the storage device resources 1702 by one or both of the data storage controller 1710 and the ML controller 1708 based, at least in part, on the ML operations of the ML controller 1708. In some examples, as shown, the ML controller 1708 is a component of the data storage controller 1710. In other examples, the ML controller 1708 is a separate component from the data storage controller 1710.

Figure 18:
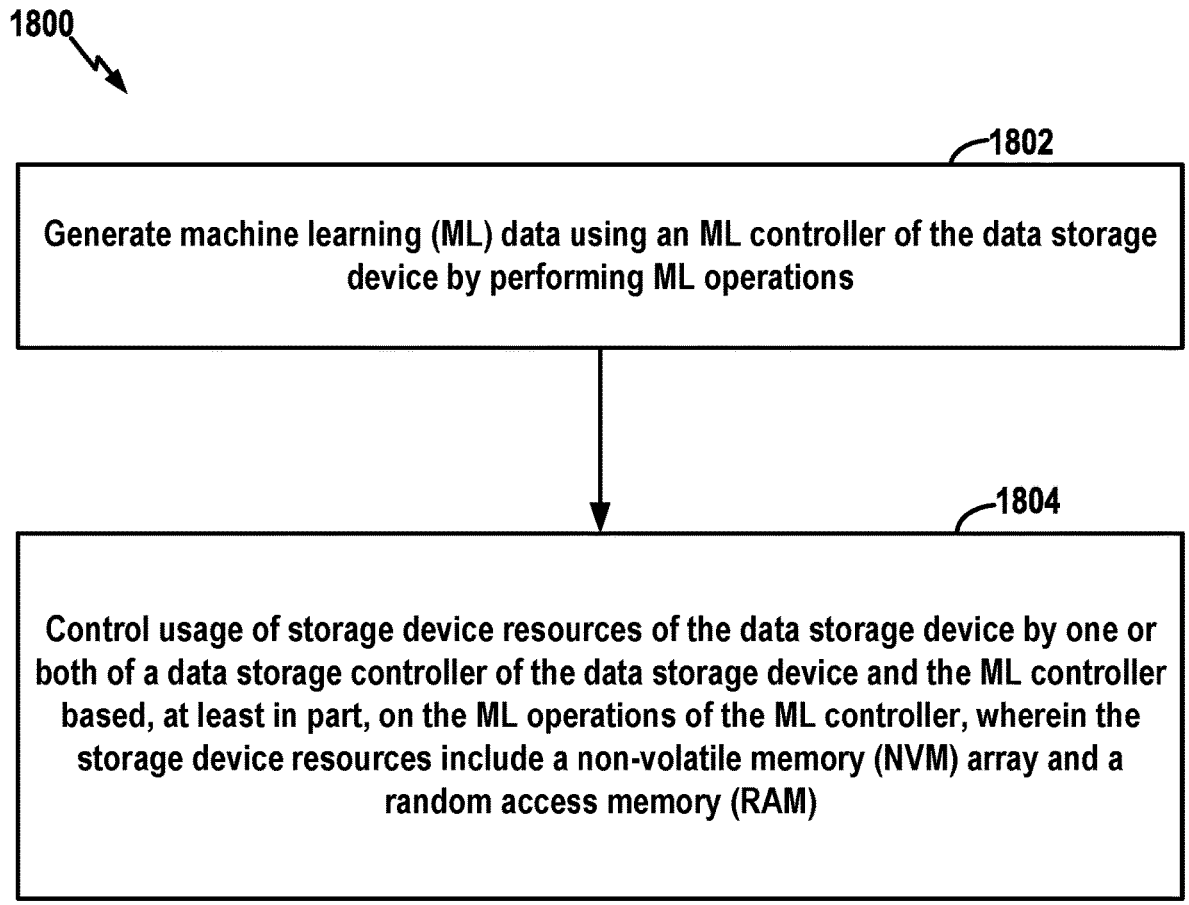
FIG. 18 illustrates an exemplary method for use by a DSD having an ML controller, a data storage controller, data storage device resources, and a resource usage controller.

FIG. 18 broadly illustrates a process 1800 in accordance with some aspects of the disclosure. The process 1800 may take place within any suitable apparatus or data storage device capable of performing the operations, such as the apparatus of FIGS. 1, 2, 17, or 19. At block 1802, the data storage device generates ML data using an ML controller of the data storage device by performing ML operations. Generating ML data can include generating intermediate ML output data based on raw ML data, as discussed above. At block 1804, the data storage device controls usage of storage device resources of the data storage device by one or both of a data storage controller of the data storage device and the ML controller based, at least in part, on the ML operations of the ML controller, wherein the storage device resources comprise a NVM array and a RAM.

Exemplary Apparatus Having with NVM Array

Figure 19:
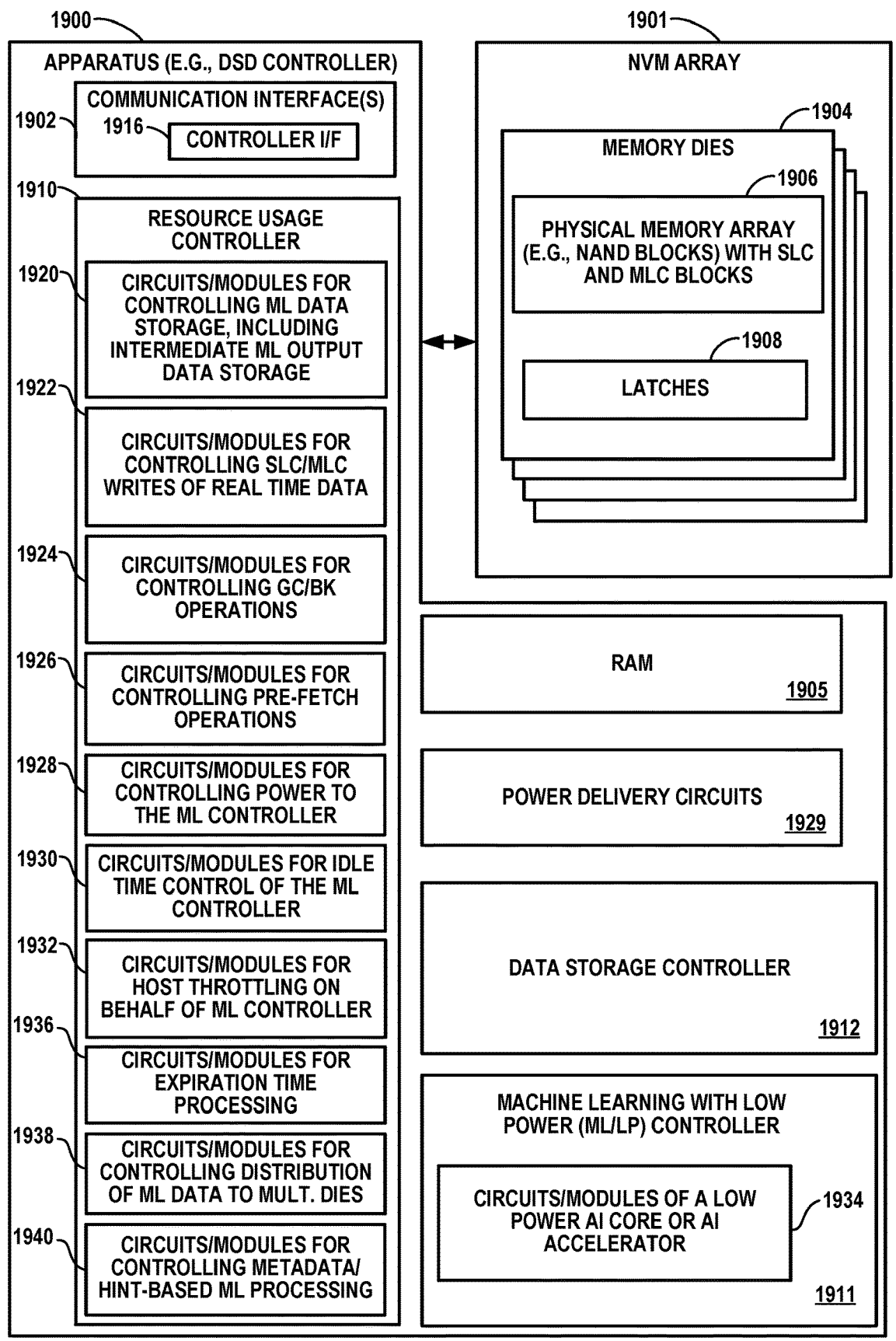
FIG. 19 is a schematic block diagram configuration for an exemplary apparatus having an ML controller, a data storage controller, data storage device resources, and a resource usage controller.

FIG. 19 illustrates an embodiment of an apparatus 1900 configured according to one or more aspects of the disclosure. The apparatus 1900, or components thereof, could embody or be implemented within a DSD other type of device that supports data storage. In various implementations, the apparatus 1900, or components thereof, could be a component of a processor, a controller, a computing device, a personal computer, a portable device, or workstation, a server, a personal digital assistant, a digital camera, a digital phone, an entertainment device, a medical device, a self-driving vehicle control device, or any other electronic device that stores, processes, or uses data. In some examples, the apparatus 1900 is an IoT device configured for ML/LP.

The apparatus 1900 is communicatively coupled to an NVM array 1901 that includes one or more memory dies 1904, each of which may include physical memory arrays 1906, e.g. NAND blocks, and latches 1908. The apparatus 1900 also includes a RAM 1905. The NVM array 1901 and the RAM 1905 may be communicatively coupled to the apparatus 1900 such that the apparatus 1900 can read or sense information from, and write or program information to, NVM array 1901 and the RAM 1905. That is, NVM array 1901 and the RAM 1905 can be coupled to circuits of apparatus 1900 so that the NVM array 1901 and the RAM 1905 are accessible by the circuits of apparatus 1900. Note that not all components of the memory dies are shown. The dies may include, e.g., extra-array processing circuits (e.g. under-the-array or next-to-the-array circuits), as well as input/output components, etc. The connection between the apparatus 1900 and the memory dies 1904 of the NVM array 1901 and the RAM 1905 may include, for example, one or more busses.

The apparatus 1900 includes a communication interface 1902, a resource usage controller 1910, an ML/LP controller 1911, and a data storage controller 1912. In other examples, as shown in FIGS. 1 and 2, the resource usage controller is a component of the data storage controller. The resource usage controller 1910 and the ML/LP controller 1911 may be on the same chip (e.g., the same ASIC), although in other examples the two controllers may be on separate chips (e.g., separate ASIC) within the apparatus 1900. The ML/LP controller 1911 may include circuits/modules 1934 of a low power AI core or AI accelerator, e.g., the ML/LP controller 1911 may be a tinyML controller or may include a tinyML core. These components can be coupled to and/or placed in electrical communication with one another and with the NVM array 1901 via suitable components, represented generally by connection lines in FIG. 19. Although not shown, other circuits such as timing sources, peripherals, voltage regulators, and power management circuits may be provided, which are well known in the art, and therefore, will not be described any further.

The communication interface 1902 provides a means for communicating with other apparatuses over a transmission medium. In some implementations, the communication interface 1902 includes circuitry and/or programming (e.g., a program) adapted to facilitate the communication of information bi-directionally with respect to one or more devices in a system. In some implementations, the communication interface 1902 may be configured for wire-based communication. For example, the communication interface 1902 could be a bus interface, a send/receive interface, or some other type of signal interface including circuitry for outputting and/or obtaining signals (e.g., outputting signal from and/or receiving signals into an SSD). The communication interface 1902 serves as one example of a means for receiving and/or a means for transmitting.

The resource usage controller 1910 and the ML/LP controller 1911 include modules and/or circuits are arranged or configured to obtain, process and/or send data, control data access and storage, issue or respond to commands, and control other desired operations. For example, the various modules/circuits may be implemented as one or more processors, one or more controllers, and/or other structures configured to perform functions. According to one or more aspects of the disclosure, at least some of the modules/circuits may be adapted to perform the various features, processes, functions, operations and/or routines described herein. For example, the various modules/circuits may be configured to perform the steps, functions, and/or processes described with respect to FIGS. 1-18.

As used herein, the term "adapted" in relation to the processing modules/circuits may refer to the modules/circuits being one or more of configured, employed, implemented, and/or programmed to perform a particular process, function, operation and/or routine according to various features described herein. The modules/circuits may include a specialized processor, such as an ASIC that serves as a means for (e.g., structure for) carrying out any one of the operations described in conjunction with FIGS. 1-18. The modules/circuits serve as an example of a means for processing. In various implementations, the modules/circuits may provide and/or incorporate, at least in part, functionality described above for the components in various embodiments shown.

According to at least one example of the apparatus 1900, the resource usage controller 1910 may include circuit/modules configured to control usage of the storage device resources of the apparatus 1900 (such as NVM array 1901 and RAM 1905) by one or both of the data storage controller 1912 and the ML/LP controller 1911 based, at least in part, on the ML operations of the ML/LP controller 1911. As explained, in some examples, the resource usage controller 1910 may be a part of the data storage controller 1912 and configured to control other components of the data storage controller. The data storage controller 1912 is configured to access the storage device resources (e.g., NVM array 1901 and RAM 1905).

The resource usage controller 1910 may also include circuits/modules 1920 configured for controlling the storage of ML data, including intermediate ML output data, e.g., intermediate ML output data. In some examples, circuits/modules 1920 are configured to determine whether ML data generated by the ML operations of the ML/LP controller 1911 is to be stored in the NVM array 1901 or in the RAM 1905 based on one or more of (a) an ML iteration turnaround time, (b) an average host session time during (or duration for) ML operations, (c) a frequency of power-loss events during ML operations, and (d) whether an output of one iteration of the ML operations is an input to a next iteration of the ML operations. In some aspects, circuits/modules 1920 are configured to control storage of the ML data in the (i) RAM 1905 in response to a determination that the ML iteration turnaround time does not exceed a turnaround time threshold or the output of one iteration of the ML operations is the input to the next iteration of the ML operation and in the (ii) NVM array 1901 in response to a determination that the ML iteration turnaround time exceeds the turnaround time threshold and the output of one iteration is not the input to the next iteration of the ML operation.

In some aspects, where the data storage controller 1912 is configured for burst processing, the circuits/modules 1920 are configured to determine whether ML data generated by the ML/LP controller 1911 is to be stored in SLC blocks or in MLC blocks of the NVM array 1901 based on one or more of (a) an ML iteration turnaround time and (b) whether the ML iteration turnaround time is increasing with successive ML iterations. In some aspects, the circuits/modules 1920 are further configured to control storage of the ML data in the (i) SLC blocks in response to the determination that the ML iteration turnaround time exceeds a turnaround time threshold or the ML iteration turnaround time is increasing with successive ML iterations and in the (ii) MLC blocks in response to the determination that the ML iteration turnaround time does not exceed the turnaround time threshold and the ML iteration turnaround time is not increasing with successive ML iterations.

In some aspects, where transient data is processed by the ML/LP controller 1911, the circuits/modules 1920 are configured to determine that transient ML data is to be stored in the latches 1908 and to control the data storage controller 1912 to store the transient ML data in the latches 1908. In some aspects, where the data storage controller 1912 is configured to reserve a portion of the RAM 1905 to store NVM address tables, the circuits/modules 1920 are configured to determine that ML data generated by the ML controller 1912 is to be stored in that portion of the RAM.

In some aspects, the circuits/modules 1920 are configured to estimate a number of ML operations required to perform an ML procedure and to allocate the storage device resources (e.g., NVM array 1901 and RAM 1905) based on the estimated number of ML operations.

The resource usage controller 1910 may also include circuits/modules 1922 configured for controlling SLC/MLC writes. In one aspect, wherein the data storage controller 1912 is configured to temporarily store data for MLC writes to the NVM array 1901 in a portion of the RAM 1905, circuits/modules 1922 are configured to determine that ML data, particularly realtime data, is to be stored in that portion of the RAM when the portion is not being used for the MLC writes.

The resource usage controller 1910 may also include circuits/modules 1924 configured for controlling GC/BK operations. In one aspect, wherein the data storage controller 1912 is configured to perform GC operations on the NVM array 1901, circuits/modules 1924 are configured to (a) suspend GC operations on the NVM array 1901 in response to a determination that a processing load of the ML/LP controller 1911 exceeds a processing load threshold and there is no GC operation exceeding a GC urgency threshold and to (b) suspend ML processing in response to a determination that there is a GC operation exceeding the GC urgency threshold. In another aspect, wherein the data storage controller 1912 is configured to perform BK operations on the NVM array 1901 such as wear leveling or read scrub that include temporarily storing data in a portion of the RAM, circuits/modules 1924 are configured to determine that ML data generated by the ML/LP controller 1911 is to be stored in that portion of the RAM 1905 while the portion is not used for the BK operations.

The resource usage controller 1910 may also include circuits/modules 1926 configured for controlling pre-fetch operations. In one aspect, circuits/modules 1926 are configured to control the ML/LP controller 1911 to pre-fetch raw ML data from a host before completion of a current iteration of an ML procedure of the ML/LP controller 1911, wherein the pre-fetch is controlled based on a consumption rate of the ML procedure.

The resource usage controller 1910 may also include circuits/modules 1928 configured for controlling power delivery to the ML/LP controller 1911. In one aspect, circuits/modules 1928 are configured to control the ML controller to receive power during a deep power down state during which at least some components of the data storage controller 1912 receive no power. For example, the circuits/modules 1928 may be coupled to power delivery circuits 1929 of the apparatus 1900 to control the power delivery circuits 1929 to deliver power to the ML/LP controller 1911 even during the deep power down state.

The resource usage controller 1910 may also include circuits/modules 1930 configured for controlling idle time operations of the ML/LP controller 1911. In one aspect, circuits/modules 1930 are configured to control the ML controller to operate during an idle time during which the data storage controller 1912 does not perform any operations on behalf of a host.

The resource usage controller 1910 may also include circuits/modules 1932 configured for controlling host throttling on behalf of the ML/LP controller 1911. In one aspect, circuits/modules 1932 are configured to control the throttling performed by the data storage controller 1912 based on a current state of an ML procedure performed by the ML/LP controller 1911.

The resource usage controller 1910 may also include circuits/modules 1936 configured for controlling expiration time processing of ML data. In one aspect, circuits/modules 1936 are configured to control the ML/LP controller 1911 to prioritize the processing of ML data stored in the NVM array 1901 based on an expiration time of the data.

The resource usage controller 1910 may also include circuits/modules 1938 configured for controlling distribution of ML data to multiple dies of the NVM array 1910. In one aspect, wherein the NVM array 1901 includes a plurality of NVM dies 1904 configured in parallel, the circuits/modules 1938 are configured to distribute the ML data across the plurality of NVM dies 1904.

The resource usage controller 1910 may also include circuits/modules 1940 configured for controlling metadata/hint-based ML processing. In one aspect, the circuits/modules 1940 are configured to control at least some ML data storage operations based on one or more of metadata or hints received from a host. In some further aspects, the circuits/modules 1940 are configured to process hints or metadata that includes one or more of: a turnaround time of an ML epoch, a stage-wise execution time of an ML operation, and a unit of storage for storing intermediate ML data.

In at least some examples, means may be provided for performing the functions illustrated in FIG. 19 and/or other functions illustrated or described herein. For example, the ML/LP controller 1911 provides a means for generating ML data by performing ML operations; the data storage controller 1912 provides a means for access storage device resources such as RAM 1905 and NVM array 1901; and the resource usage controller 1910 provides a means for controlling the usage of storage device resources (e.g., RAM 1905 and NVM array 1901) by one or both of the data storage controller 1912 and the ML/LP controller 1911 based, at least in part, on the ML operations of the ML controller.

In some aspects, the various circuit/modules of the resource usage controller 1910 provide for one or more of: means for determining whether ML data generated by the ML operations of the ML controller is to be stored in the NVM array or in the RAM based on one or more of (a) an ML iteration turnaround time, (b) an average host session time during (or duration for) ML operations, (c) a frequency of power-loss events during ML operations, and (d) whether an output of one iteration of the ML operations is an input to a next iteration of the ML operations; means for controlling the storage of the ML data in the (i) RAM in response to a determination that the ML iteration turnaround time does not exceed a turnaround time threshold or the output of one iteration of the ML operations is the input to the next iteration of the ML operation and in the (ii) NVM in response to a determination that the ML iteration turnaround time exceeds the turnaround time threshold and the output of one iteration is not the input to the next iteration of the ML operation; and means for determining whether ML data generated by the ML controller is to be stored in SLC blocks or MLC blocks of the NVM array based on one of more of (a) an ML iteration turnaround time and (b) whether the ML iteration turnaround time is increasing with successive ML iterations.

In some aspects, the various circuit/modules of the resource usage controller 1910 provide for one or more of: means for controlling storage of the ML data in the (i) SLC blocks in response to the determination that the ML iteration turnaround time exceeds a turnaround time threshold or the ML iteration turnaround time is increasing with successive ML iterations and in the (ii) MLC blocks in response to the determination that the ML iteration turnaround time does not exceed the turnaround time threshold and the ML iteration turnaround time is not increasing with successive ML iterations; means for determining that transient ML data is to be stored in the latches; means for determining that ML data generated by the ML controller is to be stored in the portion of the RAM; and means, operative in an apparatus that temporarily stores data for MLC writes to the NVM in a portion of the RAM, for determining that ML data is to be stored in the portion of the RAM otherwise used for the MLC writes when the portion is not being used for the MLC writes.

In some aspects, the various circuit/modules of the resource usage controller 1910 provide for one or more of: means, operative in an apparatus configured to perform GC operations on the NVM array, for (a) suspending GC operations on the NVM array in response to a determination that a processing load of the ML controller exceeds a processing load threshold and there is no urgent GC operation and (b) suspending ML processing in response to a determination that there is an urgent GC operation; means, operative in an apparatus that performs background operations on the NVM array that include temporarily storing data in a portion of the RAM, for determining that ML data generated by the ML controller is to be stored in the portion of the RAM while the portion of the RAM is not used for the background operations; and means for controlling an ML controller to pre-fetch raw ML data from a host before completion of a current iteration of an ML procedure of the ML controller, wherein the pre-fetch is controlled based on a consumption rate of the ML procedure.

In some aspects, the various circuit/modules of the resource usage controller 1910 provide for one or more of: means for controlling the ML controller to receive power during a deep power down state during which at least some components of the data storage controller receive no power; means for controlling the ML controller to operate during an idle time during which the data storage controller does not perform any operations on behalf of a host; means, operative in an apparatus performs host throttling, for controlling the throttling based on a current state of an ML procedure performed by the ML controller; and means for controlling the ML controller to prioritize the processing of ML data stored in the NVM array based on an expiration time of the data.

In some aspects, the various circuit/modules of the resource usage controller 1910 provide for one or more of: means, operative in an apparatus having an NVM array that includes a plurality of NVM dies configured in parallel, for distributing the ML data across the plurality of NVM dies; means for controlling at least some ML data storage operations based on one or more of metadata or hints received from a host, such as hints or metadata pertaining to a turnaround time of an ML epoch, a stage-wise execution time of an ML operation, and a unit of storage for storing intermediate ML data; and means for estimating a number of ML operations required to perform an ML procedure and for allocating the storage device resources based on the estimated number of ML operations.

In yet another aspect of the disclosure, a non-transitory computer-readable medium is provided that has one or more instructions which when executed by a processing circuit or software module in a DSD controller that causes the controller to perform one or more of the functions or operations listed above.

In at least some examples, software code may be provided for performing the functions illustrated in FIG. 19 and/or other functions illustrated or described herein. For example, the code may include one or more of: code for generating ML data by performing ML operations; code for accessing storage device resources such as RAM 1905 and NVM array 1901; and code for controlling the usage of storage device resources (e.g., RAM 1905 and NVM array 1901) by one or both of the data storage controller 1912 and the ML/LP controller 1911 based, at least in part, on the ML operations of the ML controller.

In some aspects, the code may provide for one or more of: code for determining whether ML data generated by the ML operations of the ML controller is to be stored in the NVM array or in the RAM based on one or more of (a) an ML iteration turnaround time, (b) an average host session time during (or duration for) ML operations, (c) a frequency of power-loss events during ML operations, and (d) whether an output of one iteration of the ML operations is an input to a next iteration of the ML operations; code for controlling the storage of the ML data in the (i) RAM in response to a determination that the ML iteration turnaround time does not exceed a turnaround time threshold or the output of one iteration of the ML operations is the input to the next iteration of the ML operation and in the (ii) NVM in response to a determination that the ML iteration turnaround time exceeds the turnaround time threshold and the output of one iteration is not the input to the next iteration of the ML operation; and code for determining whether ML data generated by the ML controller is to be stored in SLC blocks or MLC blocks of the NVM array based on one of more of (a) an ML iteration turnaround time and (b) whether the ML iteration turnaround time is increasing with successive ML iterations.

In some aspects, the code may provide for one or more of: code for controlling storage of the ML data in the (i) SLC blocks in response to the determination that the ML iteration turnaround time exceeds a turnaround time threshold or the ML iteration turnaround time is increasing with successive ML iterations and in the (ii) MLC blocks in response to the determination that the ML iteration turnaround time does not exceed the turnaround time threshold and the ML iteration turnaround time is not increasing with successive ML iterations; code for determining that transient ML data is to be stored in the latches; code for determining that ML data generated by the ML controller is to be stored in the portion of the RAM; and code, operative in an apparatus that temporarily stores data for MLC writes to the NVM in a portion of the RAM, for determining that ML data is to be stored in the portion of the RAM otherwise used for the MLC writes when the portion is not being used for the MLC writes.

In some aspects, the code may provide for one or more of: code, operative in an apparatus configured to perform GC operations on the NVM array, for (a) suspending GC operations on the NVM array in response to a determination that a processing load of the ML controller exceeds a processing load threshold and there is no urgent GC operation and (b) suspending ML processing in response to a determination that there is an urgent GC operation; code, operative in an apparatus that performs background operations on the NVM array that include temporarily storing data in a portion of the RAM, for determining that ML data generated by the ML controller is to be stored in the portion of the RAM while the portion of the RAM is not used for the background operations; and code for controlling an ML controller to pre-fetch raw ML data from a host before completion of a current iteration of an ML procedure of the ML controller, wherein the pre-fetch is controlled based on a consumption rate of the ML procedure.

In some aspects, the code may provide for one or more of: code for controlling the ML controller to receive power during a deep power down state during which at least some components of the data storage controller receive no power; code for controlling the ML controller to operate during an idle time during which the data storage controller does not perform any operations on behalf of a host; code, operative in an apparatus performs host throttling, for controlling the throttling based on a current state of an ML procedure performed by the ML controller; and code for controlling the ML controller to prioritize the processing of ML data stored in the NVM array based on an expiration time of the data.

In some aspects, the code may provide for one or more of: code, operative in an apparatus having an NVM array that includes a plurality of NVM dies configured in parallel, for distributing the ML data across the plurality of NVM dies; code for controlling at least some ML data storage operations based on one or more of metadata or hints received from a host, such as hints or metadata pertaining to a turnaround time of an ML epoch, a stage-wise execution time of an ML operation, and a unit of storage for storing intermediate ML data; and code for estimating a number of ML operations required to perform an ML procedure and for allocating the storage device resources based on the estimated number of ML operations.

Additional Aspects

At least some of the processing circuits described herein may be generally adapted for processing, including the execution of programming code stored on a storage medium. As used herein, the terms "code" or "programming" shall be construed broadly to include without limitation instructions, instruction sets, data, code, code segments, program code, programs, programming, subprograms, software modules, applications, software applications, software packages, routines, subroutines, objects, executables, threads of execution, procedures, functions, etc., whether referred to as software, firmware, middleware, microcode, hardware description language, or otherwise.

At least some of the processing circuits described herein may be arranged to obtain, process and/or send data, control data access and storage, issue commands, and control other desired operations. The processing circuits may include circuitry configured to implement desired programming provided by appropriate media in at least one example. For example, the processing circuits may be implemented as one or more processors, one or more controllers, and/or other structure configured to execute executable programming. Examples of processing circuits may include a general purpose processor, a digital signal processor (DSP), an ASIC, a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. At least some of the processing circuits may also be implemented as a combination of computing components, such as a combination of a controller and a microprocessor, a number of microprocessors, one or more microprocessors in conjunction with an ASIC and a microprocessor, or any other number of varying configurations. The various examples of processing circuits noted herein are for illustration and other suitable configurations within the scope of the disclosure are also contemplated.

Aspects of the subject matter described herein can be implemented in any suitable NAND flash memory, such as 3D NAND flash memory. Semiconductor memory devices include volatile memory devices, such as DRAM or SRAM devices, NVM devices, such as ReRAM, EEPROM, flash memory (which can also be considered a subset of EEPROM), ferroelectric random access memory (FRAM), and MRAM, and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements. One of skill in the art will recognize that the subject matter described herein is not limited to the two dimensional and three dimensional exemplary structures described but cover all relevant memory structures within the spirit and scope of the subject matter as described herein and as understood by one of skill in the art.

The examples set forth herein are provided to illustrate certain concepts of the disclosure. The apparatus, devices, or components illustrated above may be configured to perform one or more of the methods, features, or steps described herein. Those of ordinary skill in the art will comprehend that these are merely illustrative in nature, and other examples may fall within the scope of the disclosure and the appended claims. Based on the teachings herein those skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein.

Aspects of the present disclosure have been described above with reference to schematic flowchart diagrams and/or schematic block diagrams of methods, apparatus, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

The subject matter described herein may be implemented in hardware, software, firmware, or any combination thereof. As such, the terms "function," "module," and the like as used herein may refer to hardware, which may also include software and/or firmware components, for implementing the feature being described. In one example implementation, the subject matter described herein may be implemented using a computer readable medium having stored thereon computer executable instructions that when executed by a computer (e.g., a processor) control the computer to perform the functionality described herein. Examples of computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

The various features and processes described above may be used independently of one another, or may be combined in various ways. All possible combinations and sub-combinations are intended to fall within the scope of this disclosure. In addition, certain method, event, state or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other suitable manner. Tasks or events may be added to or removed from the disclosed example embodiments. The example systems and components described herein may be configured differently than described. For example, elements may be added to, removed from, or rearranged compared to the disclosed example embodiments.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The word "exemplary" is used herein to mean "serving as an example, instance, or illustration." Any aspect described herein as "exemplary" is not necessarily to be construed as preferred or advantageous over other aspects. Likewise, the term "aspects" does not require that all aspects include the discussed feature, advantage or mode of operation.

While the above descriptions contain many specific embodiments of the invention, these should not be construed as limitations on the scope of the invention, but rather as examples of specific embodiments thereof. Accordingly, the scope of the invention should be determined not by the embodiments illustrated, but by the appended claims and their equivalents. Moreover, reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise.

The terminology used herein is for the purpose of describing particular aspects only and is not intended to be limiting of the aspects. As used herein, the singular forms "a," "an" and "the" are intended to include the plural forms as well (i.e., one or more), unless the context clearly indicates otherwise. An enumerated listing of items does not imply that any or all of the items are mutually exclusive and/or mutually inclusive, unless expressly specified otherwise. It will be further understood that the terms "comprises," "comprising," "includes" "including," "having," and variations thereof when used herein mean "including but not limited to" unless expressly specified otherwise. That is, these terms may specify the presence of stated features, integers, steps, operations, elements, or components, but do not preclude the presence or addition of one or more other features, integers, steps, operations, elements, components, or groups thereof. Moreover, it is understood that the word "or" has the same meaning as the Boolean operator "OR," that is, it encompasses the possibilities of "either" and "both" and is not limited to "exclusive or" ("XOR"), unless expressly stated otherwise. It is also understood that the symbol "/" between two adjacent words has the same meaning as "or" unless expressly stated otherwise. Moreover, phrases such as "connected to," "coupled to" or "in communication with" are not limited to direct connections unless expressly stated otherwise.

Any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be used there or that the first element must precede the second element in some manner. Also, unless stated otherwise a set of elements may include one or more elements. In addition, terminology of the form "at least one of A, B, or C" or "A, B, C, or any combination thereof" used in the description or the claims means "A or B or C or any combination of these elements." For example, this terminology may include A, or B, or C, or A and B, or A and C, or A and B and C, or 2A, or 2B, or 2C, or 2A and B, and so on. As a further example, "at least one of: A, B, or C" is intended to cover A, B, C, A-B, A-C, B-C, and A-B-C, as well as multiples of the same members (e.g., any lists that include AA, BB, or CC). Likewise, "at least one of: A, B, and C" is intended to cover A, B, C, A-B, A-C, B-C, and A-B-C, as well as multiples of the same members. Similarly, as used herein, a phrase referring to a list of items linked with "and/or" refers to any combination of the items. As an example, "A and/or B" is intended to cover A alone, B alone, or A and B together. As another example, "A, B and/or C" is intended to cover A alone, B alone, C alone, A and B together, A and C together, B and C together, or A, B, and C together.

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

What is claimed is:

1. A data storage device, comprising:
    data storage device resources comprising a non-volatile memory (NVM) array and a random access memory (RAM);
    a machine learning (ML) controller configured to perform ML operations to process ML data;
    a data storage controller coupled to the ML controller and the data storage device resources and configured to access the data storage device resources; and
    a resource usage controller configured to control usage of the data storage device resources by both the data storage controller and the ML controller by being configured to determine whether ML data generated by the ML operations of the ML controller is to be stored in the NVM array or in the RAM, with the determination based, at least in part, on the ML operations of the ML controller.

2. The data storage device of claim 1, wherein the ML controller is further configured to consume 10 milliWatts (mW) or less of power.

3. The data storage device of claim 1, wherein the resource usage controller is further configured to determine whether the ML data generated by the ML operations of the ML controller is to be stored in the NVM array or in the RAM based on one or more of: (a) an ML iteration turnaround time, (b) an average host session duration for ML operations, (c) a frequency of power-loss events during ML operations, and (d) whether an output of one iteration of the ML operations is an input to a next iteration of the ML operations.

4. The data storage device of claim 3, wherein the resource usage controller is further configured to control storage of the ML data in the:
    (i) RAM in response to a determination that the ML iteration turnaround time does not exceed a turnaround time threshold or the output of one iteration of the ML operations is the input to the next iteration of the ML operation, and
    (ii) NVM array in response to a determination that the ML iteration turnaround time exceeds the turnaround time threshold and the output of one iteration is not an input to the next iteration of the ML operation.

5. The data storage device of claim 1, wherein the data storage controller is further configured for burst processing, and wherein the resource usage controller is further configured to determine whether ML data generated by the ML controller is to be stored in single level cell (SLC) blocks or in multi-level cell (MLC) blocks of the NVM array based on one of more of (a) an ML iteration turnaround time, and (b) whether the ML iteration turnaround time is increasing with successive ML iterations.

6. The data storage device of claim 5, wherein the resource usage controller is further configured to control storage of the ML data in the:
   (i) SLC blocks in response to the determination that the ML iteration turnaround time exceeds a turnaround time threshold or the ML iteration turnaround time is increasing with successive ML iterations, and in the
   (ii) MLC blocks in response to the determination that the ML iteration turnaround time does not exceed the turnaround time threshold and the ML iteration turnaround time is not increasing with successive ML iterations.

7. The data storage device of claim 1,
   wherein the NVM array comprises latches formed on a die of the NVM array, and
   wherein the resource usage controller is further configured to determine that transient ML data is to be stored in the latches.

8. The data storage device of claim 1,
   wherein the data storage controller is further configured to reserve a portion of the RAM to store NVM address tables, and
   wherein the resource usage controller is further configured to determine that ML data generated by the ML controller is to be stored in the portion of the RAM.

9. The data storage device of claim 1,
   wherein the data storage controller is further configured to temporarily store data for multi-level cell (MLC) writes to the NVM array in a portion of the RAM, and
   wherein the resource usage controller is further configured to determine that ML data is to be stored in the portion of the RAM when the portion of the RAM is not being used for the MLC writes.

10. The data storage device of claim 1,
    wherein the data storage controller is further configured to perform garbage collection (GC) operations on the NVM array, and
    wherein the resource usage controller is further configured to (a) suspend GC operations on the NVM array in response to a determination that a processing load of the ML controller exceeds a processing load threshold and there are no urgent GC operations pending and to (b) suspend ML processing in response to a determination that there is an urgent GC operation pending.

11. The data storage device of claim 1,
    wherein the data storage controller is further configured to perform background operations on the NVM array that include temporarily storing data in a portion of the RAM, and
    wherein the resource usage controller is further configured to determine that ML data generated by the ML controller is to be stored in the portion of the RAM while the portion of the RAM is not used for the background operations.

12. The data storage device of claim 1, wherein the resource usage controller is further configured to control the ML controller to pre-fetch raw ML data from a host before completion of a current iteration of an ML procedure of the ML controller, and wherein the pre-fetch is controlled based on a consumption rate of the ML procedure.

13. The data storage device of claim 1, wherein the resource usage controller is further configured to control the ML controller to receive power during a power down state during which at least some components of the data storage controller receive no power.

14. The data storage device of claim 1, wherein the resource usage controller is further configured to control the ML controller to operate during an idle time during which the data storage controller does not perform operations on behalf of a host.

15. The data storage device of claim 1, wherein the data storage controller is further configured to perform host throttling, and wherein the resource usage controller is further configured to control the throttling based on a current state of an ML procedure performed by the ML controller.

16. The data storage device of claim 1, wherein the resource usage controller is further configured to control the ML controller to prioritize the processing of ML data stored in the NVM array based on an expiration time of the data.

17. The data storage device of claim 1, wherein the NVM array comprises a plurality of NVM dies configured in parallel, and wherein the resource usage controller is further configured to distribute the ML data across the plurality of NVM dies.

18. The data storage device of claim 1, wherein the resource usage controller is further configured to control at least some ML data storage operations based on one or more of metadata or hints received from a host.

19. The data storage device of claim 18, wherein the one or more of the metadata or the hints received from the host comprise: a turnaround time of an ML epoch, a stage-wise execution time of an ML operation, and a unit of storage for storing intermediate ML data.

20. The data storage device of claim 1, wherein the resource usage controller is further configured to estimate a number of ML operations required to perform an ML procedure and to allocate the data storage device resources based on the estimated number of ML operations.

21. The data storage device of claim 1, wherein the resource usage controller is a component of the data storage controller.

22. The data storage device of claim 1, wherein the ML controller, the resource usage controller, and the data storage controller are all formed on a single integrated circuit.

23. A method for use by a data storage device, the method comprising:
    generating machine learning (ML) data using an ML controller of the data storage device by performing ML operations; and
    controlling usage of data storage device resources of the data storage device by both a data storage controller of the data storage device and the ML controller, wherein the data storage device resources comprise a non-volatile memory (NVM) array and a random access memory (RAM), and wherein controlling the usage of the data storage device resources comprises determining whether the ML data generated by the ML operations of the ML controller is to be stored in the NVM array or in the RAM, with the determination based, at least in part, on the ML operations of the ML controller.

24. The method of claim 23, wherein the ML controller is configured to consume 10 milliWatts (mW) or less, and wherein controlling usage of the data storage device resources comprises arbitrating access to the data storage device resources by the data storage controller and the ML controller based, at least in part, on the ML operations of the ML controller.

25. An apparatus of a data storage device, the apparatus comprising:

means for generating machine learning (ML) data by performing ML operations; and
means for controlling usage of data storage device resources of the data storage device by both a data storage controller of the data storage device and the means for generating ML data, wherein the data storage device resources comprise a non-volatile memory (NVM) array and a random access memory (RAM), and wherein the means for controlling comprises means for determining whether the ML data generated by the ML operations of the ML controller is to be stored in the NVM array or in the RAM, with the determination based, at least in part, on the ML operations of the means for generating ML data.

26. A data storage device, comprising:
data storage device resources comprising a non-volatile memory (NVM) array and a random access memory (RAM);
a machine learning (ML) controller configured to perform ML operations to process ML data;
a data storage controller coupled to the ML controller and the data storage device resources and configured to access the data storage device resources; and
a resource usage controller configured to control usage of the data storage device resources by both the data storage controller and the ML controller based, at least in part, on the ML operations of the ML controller;
wherein the data storage controller is further configured to temporarily store data for multi-level cell (MLC) writes to the NVM array in a portion of the RAM; and
wherein the resource usage controller is further configured to determine that ML data is to be stored in the portion of the RAM when the portion of the RAM is not being used for the MLC writes.

27. A data storage device, comprising:
data storage device resources comprising a non-volatile memory (NVM) array and a random access memory (RAM);
a machine learning (ML) controller configured to perform ML operations to process ML data;
a data storage controller coupled to the ML controller and the data storage device resources and configured to access the data storage device resources; and
a resource usage controller configured to control usage of the data storage device resources by both the data storage controller and the ML controller based, at least in part, on the ML operations of the ML controller;
wherein the resource usage controller is further configured to control the ML controller to pre-fetch raw ML data from a host before completion of a current iteration of an ML procedure of the ML controller, and wherein the pre-fetch is controlled based on a consumption rate of the ML procedure.

28. A data storage device, comprising:
data storage device resources comprising a non-volatile memory (NVM) array and a random access memory (RAM);
a machine learning (ML) controller configured to perform ML operations to process ML data;
a data storage controller coupled to the ML controller and the data storage device resources and configured to access the data storage device resources; and
a resource usage controller configured to control usage of the data storage device resources by both the data storage controller and the ML controller based, at least in part, on the ML operations of the ML controller;
wherein the resource usage controller is further configured to control the ML controller to receive power during a deep power down state during which at least some components of the data storage controller receive no power.

29. A data storage device, comprising:
data storage device resources comprising a non-volatile memory (NVM) array and a random access memory (RAM);
a machine learning (ML) controller configured to perform ML operations to process ML data;
a data storage controller coupled to the ML controller and the data storage device resources and configured to access the data storage device resources; and
a resource usage controller configured to control usage of the data storage device resources by both the data storage controller and the ML controller based, at least in part, on the ML operations of the ML controller;
wherein the data storage controller is further configured to perform host throttling; and
wherein the resource usage controller is further configured to control the throttling based on a current state of an ML procedure performed by the ML controller.

\* \* \* \* \*